(12) United States Patent
Pietruczynik et al.

(10) Patent No.: US 8,955,281 B2
(45) Date of Patent: Feb. 17, 2015

(54) EXTERIOR BUILDING MATERIAL HAVING A HOLLOW THIN WALL PROFILE AND AN EMBOSSED LOW GLOSS SURFACE

(75) Inventors: Christopher B. Pietruczynik, Norristown, PA (US); Kenneth D. Bosler, Warminster, PA (US); Thomas Gilbert, Clarklake, MI (US); Mark Suchyna, Lancaster, NY (US); Mark Dunmire, N. Tonawanda, NY (US)

(73) Assignee: Certainteed Corporation, Valley Forge, PA (US)

( * ) Notice: Subject to any disclaimer, the term of this patent is extended or adjusted under 35 U.S.C. 154(b) by 925 days.

(21) Appl. No.: 12/685,800

(22) Filed: Jan. 12, 2010

(65) Prior Publication Data

US 2010/0107530 A1    May 6, 2010

Related U.S. Application Data

(62) Division of application No. 11/773,108, filed on Jul. 3, 2007.

(60) Provisional application No. 60/807,081, filed on Jul. 12, 2006, provisional application No. 60/807,082, filed on Jul. 12, 2006.

(51) Int. Cl.
*E04C 3/00* (2006.01)
*E04B 2/00* (2006.01)
(Continued)

(52) U.S. Cl.
CPC ............... *E04C 2/20* (2013.01); *B29C 47/0028* (2013.01); *B29C 47/0038* (2013.01); *B29C 47/046* (2013.01); *B29C 47/12* (2013.01);
(Continued)

(58) Field of Classification Search
USPC ............... 52/588.1, 580, 589.1, 590.1, 590.2, 52/590.3, 630
See application file for complete search history.

(56) References Cited

U.S. PATENT DOCUMENTS

3,577,484 A    5/1971    Jacobson
3,635,614 A    1/1972    Long et al.
(Continued)

FOREIGN PATENT DOCUMENTS

DE          9403833         5/1994
WO      WO2005/042868      12/2005
(Continued)

OTHER PUBLICATIONS

Prestige Wake up to the newest thing in fencing. Bufftech. trade literature, 5 pages.
(Continued)

*Primary Examiner* — Brian Glessner
*Assistant Examiner* — Omar Hijaz
(74) *Attorney, Agent, or Firm* — Alexander H. Plache; Abel Law Group, LLP

(57) ABSTRACT

A building product which includes a hollow extrudate, unitary reinforcing ribs resisting collapse of the hollow extrudate and, in an embodiment, an exterior surface comprises a low gloss, textured pattern having a gloss level of less than about 50 on a 60° glossmeter, in which the textured pattern extends for about 2-20 feet. Methods and an apparatus for manufacturing such products are also provided by this invention.

14 Claims, 7 Drawing Sheets

(51) Int. Cl.
  *E04B 2/08*   (2006.01)
  *E04C 2/32*   (2006.01)
  *E04C 2/20*   (2006.01)
  *B29C 47/00*  (2006.01)
  *B29C 47/04*  (2006.01)
  *B29C 47/12*  (2006.01)
  *B29C 59/04*  (2006.01)
  *B29C 59/06*  (2006.01)
  *E04C 2/36*   (2006.01)
  *B29C 47/02*  (2006.01)
  *B29L 24/00*  (2006.01)
  *B29L 31/60*  (2006.01)

(52) U.S. Cl.
  CPC ............ *B29C 59/04* (2013.01); *B29C 59/06* (2013.01); *E04C 2/36* (2013.01); *B29C 47/0054* (2013.01); *B29C 47/02* (2013.01); *B29K 2995/0072* (2013.01); *B29L 2024/006* (2013.01); *B29L 2031/60* (2013.01)
  USPC .......... 52/580; 52/588.1; 52/589.1; 52/590.1; 52/590.3; 52/630

(56) References Cited

U.S. PATENT DOCUMENTS

| | | | |
|---|---|---|---|
| 3,814,493 A | 6/1974 | Radke | |
| 3,837,517 A | 9/1974 | Held, Jr. | |
| 3,875,088 A | 4/1975 | Arons et al. | |
| 3,936,518 A | 2/1976 | Soda et al. | |
| 3,093,195 A | 9/1976 | Arons et al. | |
| 3,983,295 A | 9/1976 | Murer et al. | |
| 3,983,668 A | 10/1976 | Hassman | |
| 4,015,391 A | 4/1977 | Epstein et al. | |
| 4,048,101 A | 9/1977 | Nakamachi et al. | |
| 4,128,369 A | 12/1978 | Kemerer et al. | |
| 4,141,944 A | 2/1979 | Anstadt et al. | |
| 4,265,981 A | 5/1981 | Campbell | |
| 4,290,248 A | 9/1981 | Kemerer et al. | |
| 4,468,909 A | 9/1984 | Eaton | |
| 4,536,997 A | 8/1985 | Heescher | |
| 4,557,091 A | 12/1985 | Auer | |
| 4,571,118 A | 2/1986 | Schumanski | |
| 4,649,008 A | 3/1987 | Johnstone et al. | |
| 4,680,911 A | 7/1987 | Davis et al. | |
| 4,812,343 A | 3/1989 | Kiekhaefer et al. | |
| 4,820,749 A | 4/1989 | Beshay | |
| 4,860,996 A | 8/1989 | Robbins, III | |
| 5,008,310 A | 4/1991 | Beshay | |
| 5,030,662 A | 7/1991 | Banerjie | |
| 5,053,176 A | 10/1991 | Cameron et al. | |
| 5,076,037 A | 12/1991 | Crick et al. | |
| 5,152,034 A * | 10/1992 | Konings et al. | 24/30.5 R |
| 5,167,781 A | 12/1992 | Kemerer et al. | |
| 5,189,822 A | 3/1993 | Schmanski et al. | |
| 5,219,656 A | 6/1993 | Klett et al. | |
| 5,224,318 A | 7/1993 | Kemerer | |
| 5,244,618 A | 9/1993 | Kemerer et al. | |
| 5,249,402 A | 10/1993 | Crick et al. | |
| 5,314,325 A | 5/1994 | Bosler | |
| 5,318,737 A | 6/1994 | Trabert et al. | |
| 5,330,341 A | 7/1994 | Kemerer et al. | |
| 5,332,602 A | 7/1994 | Barre et al. | |
| 5,347,784 A | 9/1994 | Crick et al. | |
| 5,363,623 A | 11/1994 | King | |
| 5,387,381 A | 2/1995 | Saloom | |
| 5,444,099 A | 8/1995 | Abe et al. | |
| 5,458,477 A | 10/1995 | Kemerer et al. | |
| 5,486,416 A | 1/1996 | Johnson et al. | |
| 5,505,599 A | 4/1996 | Kemerer et al. | |
| 5,505,612 A | 4/1996 | Mero et al. | |
| 5,529,431 A | 6/1996 | Walsh | |
| 5,547,325 A | 8/1996 | Tucker et al. | |
| 5,553,427 A * | 9/1996 | Andres | 52/177 |
| 5,575,127 A | 11/1996 | O'Neal | |
| 5,580,626 A | 12/1996 | Quigley et al. | |
| 5,597,185 A | 1/1997 | Bray et al. | |
| 5,635,125 A | 6/1997 | Ternes et al. | |
| 5,651,227 A | 7/1997 | Anderson | |
| 5,694,728 A * | 12/1997 | Heath et al. | 52/554 |
| 5,700,495 A | 12/1997 | Kemerer et al. | |
| 5,729,946 A | 3/1998 | Beck | |
| 5,792,529 A | 8/1998 | May | |
| 5,836,128 A | 11/1998 | Groh et al. | |
| 5,839,247 A | 11/1998 | Beck | |
| 5,847,016 A | 12/1998 | Cope | |
| 5,857,303 A | 1/1999 | Beck et al. | |
| 5,866,054 A | 2/1999 | Dorchester et al. | |
| 5,866,639 A | 2/1999 | Dorchester et al. | |
| 5,869,176 A | 2/1999 | Dorchester et al. | |
| 5,878,542 A | 3/1999 | Cornelius | |
| 5,881,501 A | 3/1999 | Guffey et al. | |
| 5,881,508 A * | 3/1999 | Irvine et al. | 52/177 |
| 5,906,840 A | 5/1999 | Bosler | |
| 5,927,044 A | 7/1999 | Lamb et al. | |
| D414,568 S | 9/1999 | Hedges et al. | |
| 5,967,498 A | 10/1999 | Junell | |
| 5,997,784 A | 12/1999 | Karnoski | |
| 6,009,682 A | 1/2000 | Lehman et al. | |
| 6,042,305 A | 3/2000 | Novich et al. | |
| 6,125,905 A | 10/2000 | Woodside et al. | |
| 6,156,682 A | 12/2000 | Fletemier et al. | |
| 6,197,412 B1 | 3/2001 | Jambois | |
| 6,276,107 B1 | 8/2001 | Waggoner et al. | |
| 6,319,456 B1 | 11/2001 | Gilbert et al. | |
| 6,324,796 B1 | 12/2001 | Heath | |
| 6,344,268 B1 | 2/2002 | Stucky et al. | |
| 6,357,197 B1 | 3/2002 | Serino et al. | |
| 6,427,395 B1 | 8/2002 | Elasser et al. | |
| 6,502,360 B2 | 1/2003 | Carr et al. | |
| 6,572,932 B2 * | 6/2003 | Sigel et al. | 427/510 |
| 6,651,384 B1 | 11/2003 | Williames | |
| 6,702,259 B2 | 3/2004 | Pratt | |
| 6,737,008 B2 | 5/2004 | Gilbert et al. | |
| 6,752,941 B2 * | 6/2004 | Hills | 264/75 |
| 6,758,996 B2 | 7/2004 | Monovoukas et al. | |
| 6,823,794 B2 | 11/2004 | Bosler | |
| 7,074,918 B2 | 7/2006 | Medoff et al. | |
| 7,204,062 B2 | 4/2007 | Fairbanks et al. | |
| 7,258,913 B2 | 8/2007 | Jo et al. | |
| 2003/0004232 A1 | 1/2003 | Ruede | |
| 2003/0021915 A1 | 1/2003 | Rohatgi et al. | |
| 2003/0082338 A1 | 5/2003 | Baker | |
| 2003/0096096 A1 | 5/2003 | Jo et al. | |
| 2003/0198736 A1 | 10/2003 | Fensel et al. | |
| 2003/0218266 A1 | 11/2003 | Hills | |
| 2004/0048055 A1 | 3/2004 | Branca | |
| 2004/0134162 A1 * | 7/2004 | Douglas | 52/741.1 |
| 2005/0003221 A1 | 1/2005 | Walrath | |
| 2005/0053767 A1 | 3/2005 | Franco et al. | |
| 2005/0127345 A1 | 6/2005 | Giacchino | |
| 2005/0266210 A1 | 12/2005 | Dolinar et al. | |
| 2005/0271872 A1 | 12/2005 | Dolinar | |
| 2005/0271889 A1 | 12/2005 | Dolinar | |
| 2006/0068131 A1 | 3/2006 | Hanrahan | |
| 2006/0068215 A2 | 3/2006 | Dolinar | |
| 2007/0090334 A1 | 4/2007 | Laws et al. | |
| 2007/0092701 A1 | 4/2007 | Jeng | |
| 2007/0158629 A1 | 7/2007 | Laws et al. | |

FOREIGN PATENT DOCUMENTS

WO   WO 2006/036409 A2   6/2006
WO   WO 2007/047968       4/2007

OTHER PUBLICATIONS

Prestige. Set yourself apart. Bufftech. trade literature, 6 pages.
Twintex Applications. Vetrotex. trade literature, 1 page.
Glossary of Terms, Introduction to Composites, pp. 19 and 20.
Harvey, Martin T., "Thermoplastic Matrix Processing", pp. 544-553.
Martin, Jeffrey D., "Pultrusion", pp. 533-543.

(56) References Cited

OTHER PUBLICATIONS

Tecton Products: Innovative Composite Pultrusion Solutions, trade literature, 2 pages.
E-Z Rail Products, trade literature, 2 pages.
Geotek: Your Source for Quality Animal Containment. trade literature 3 pages.
Google Web Directory, "Composite Plastic", May 12, 2003, 4 pages.
Google Editorial Calendar, "Plastic Fencing", May 12, 2001, 2 pages.
Matuana et al., Polymer Engineering and Science, "Processing and cell morphology relationships for Microcellular foamed PVC/wood fiber composites", vol. 37, No. 7, Jul. 1997, pp. 1137-1147.
Matuana et al., Cellular and Microcellular Materials, Effect of cell morphology on the properties of microcellular foamed PVC/wood fiber composites, vol. 76, 1993, 16 pages.
Saint-Gobain Vetrotex, Twintex, Products Available, Trade literature, May 21, 2004, pp. 1, 2.
Saint-Gobain Vetrotex, Twintex, News, Trade literature, , May 21, 2004, pp. 1-3.
Testing Hardness of a Mineral, Mohs Hardness Scale, Trade literature, Http:/realgar.mcli.dist.maricopa.edu/aaim/linear/LO.html.
International Search Report dated Jan. 22, 2003.
International Search Report dated Feb. 19, 2004.
Kroy Trade literature, Section 02820, Fences and Gates, Sep. 2002, pp. 1-8.
Kroy Trade literature, Beyond Black™ Ornamental Fence, Jul. 8, 2003, pp. 1-2.
Office Action dated May 19, 2006, in U.S. Appl. No. 10/939,600.
Office Action dated May 23, 2005, in U.S. Appl. No. 10/939,600.
Office Action dated Aug. 29, 2006 in U.S. Appl. No. 10/441,530.
Office Action dated Sep. 25, 2006 in U.S. Appl. No. 10/983,389.
Office Action dated Dec. 14, 2005 in U.S. Appl. No. 10/939,600.
Office Action dated Jan. 30, 2006 in U.S. Appl. No. 10/441,530.
U.S. Appl. No. 10/983,389, filed Nov. 8, 2004, Guiselein et al.
"Acrylic Resin Improves PVC Substrate Appearance", ThomasNet Industrial Newsroom, Aug. 13, 2002, 1 page, www.news.thomasnet.com.
"New Solarkote® PV Acrylic Capstock Resin from Autoglas Improves Weatherability and Appearance of PVC Substrates", ThomasNet Industrial Newsroom, Aug. 16, 2002, pp. 1-4, www.news.thomasnet.com.
Capstock, Films Vie to Protect Outdoor Products, Modern Plastics 2005, pp. 1-2, www.modplas.com/inc/mparticle.
Wolverine Master Craftsmen Education and Development Program, Wolverine Siding Systems, 2002, pp. i-12, www.siding.com.
Kynar® PVDF, Arkema Corp., pp. 1-2, http://www.arkema.com/sites/group/en/products/home.page.
Office Action dated Nov. 17, 2004 in U.S. Appl. No. 10/281,796.
Office Action dated Jan. 29, 2003 in U.S. Appl. No. 09/988,985.
Office Action dated Sep. 22, 2003 in U.S. Appl. No. 09/988,985.
Office Action dated Jan. 27, 2004 in U.S. Appl. No. 09/988,985.
Office Action dated Oct. 18, 2004 in U.S. Appl. No. 09/988,985.
Office Action dated Mar. 21, 2005 in U.S. Appl. No. 09/988,985.
U.S. Appl. No. 10/292,748, filed Nov. 12, 2002.
"Trex coextrudes white PVC railing", Trade literature, Jan. 21, 2005, 2 pages, http://finance.messages.yahoo.com/bbs?.mm=FN&action=m&board=18343131&tid=twp.
Wood Extrusion, Wood is Good for Compounding, Sheet & Profile, Trade Literature, Feb. 22, 2005, 6 pages http://www.feedscrews.com/shownews/381.
ebuild, Spotlight Decking, Trade literature, Aug. 19, 2004, 4 pages http://www.ebuild.com/guide/resources/product-news-print.asp?id=68609.
Woodchuk Composite Railing System, Performs Better Than Wood Could, Trade literature, 2005, 4 pages http://woodchuk.com.
Hand-split Shake, Nailite International 2008, pp. 1-5.
Perfection-plus Cedar, Nailite International 2008, pp. 1-5.
"Solarkote® A Acrylic Capstock Resins Extend UV Protection for ABS Substrates", ThomasNet Industrial News Room, Oct. 14, 2002, pp. 1-4, www.news.thomasnet.com.
Pipe and Profile, International Trade Fair, British Plastics & Rubber, May 2004, pp. 14-22, www.polymer-age.co.uk.
Capstock, Vinyl by Design, Siding, Glossary, 2005, pp. 1-2, www.vinylbydesign.com.
Solarkote, Acrylic Capstock for Vinyl Fencing, Atoglas, Atofina Chemicals, 2003, 5 pages.
Frequently Asked Questions, PPG Industries, Inc., Industrial Coatings, 1996-2001, pp. 1-3, www.ppg.com/car.
Coating Materials and Specifications List, Orion Industries Ltd., 2005, 2 pages, www.orioncoat.com/services/list.html.
Powder Coating Forum, PF Online, 2005, 2 pages, www.pfonline.com/dp/forums/forum.
Teflon Coating Application, ICS Technologies, 1997-2001, pp. 1-3, www.icstechnologies.com.
"Should We Phase Out PVC?", Feature—Environmental Building News, Jan./Feb. 1994, pp. 1-21, www.buildinggreen.com/features.
"The 120 Best Matching Products in Building Supplies/Millwork/Moulding", PriceComparison.com, 2004, pp. 1-7, http://64.233.167.104/search?q=cache:bKO551DVZPEJ:forsoftwares.com/search.php%3F.
Gu et al., "System Interactions in Forced-Air Heating and Cooling Systems, Part I: Equipment Efficiency Factors", ASHRAE Transactions 2003, pp. 474-484.
Gu et al., System Interactions in Forced-Air Heating and Cooling Systems, Part II: Continuous Fan Operation, ASHRAE Transactions 2003, pp. 371-379.
Gu et al., "Comparison of Duct Computer Models That Could Provide Input to the Proposed Thermal Distribution Standard Method of Test", ASHRAE Transactions 1998, pp. 1-11, vol. 104, Pt. 1.
Kerestecioglu et al., "Theoretical and Computational Investigation of Simultaneous Heat and Moisture Transfer in Buildings: "Effective Penetration Depth" Theory", Florida Solar Energy Center (undated), pp. 447-454.
Abaza, Hussein, Utilizing Latent Building Thermal Mass for Dehumidification, J. Bldg. Physics 2005, abstract, vol. 29, No. 1.
Rudd and Lstiburek, "Vented and Sealed Attics in Hot Climates", ASHRAE Transactions 1997, pp. 1-14.
Gu, L., "Examine potential energy savings using ceiling insulation mixed with desiccant", CertainTeed Contract Report 2005, pp. 1-19; 1-16.
Huang et al., "Residential Heating and Cooling Loads Component Analysis", University of California, Berkeley 1999, pp. 1-13; Appendices A1-A6; B1-B30; C3-C11' P1-P30.
Kerestecioglu et al., Users Manual (Draft), Florida Solar Energy Center (undated) Sections 1.1-11; 2.1-64; 3.1-46; 4.1-21; 5.1-43; 6.1-67; Appendices A1-A10; B1-B9; G1-G7; I1-I4; R1-R2.
International Search Report in PCT/IL2004/000681, dated Nov. 23, 2004.

\* cited by examiner

EXTERIOR BUILDING MATERIAL HAVING A HOLLOW THIN WALL PROFILE AND AN EMBOSSED LOW GLOSS SURFACE

CROSS-REFERENCE TO RELATED APPLICATIONS

The present application is a Divisional application of U.S. Ser. No. 11/773,108, filed Jul. 3, 2007, which claims the benefit of both U.S. Provisional Application No. 60/807,081, filed Jul. 12, 2006 and U.S. Provisional Application No. 60/807,082, filed Jul. 12, 2006.

This application is related to U.S. application Ser. No. 10/281,795, filed Oct. 28, 2002, of Byeong Jo and John Peavey, entitled "Plastic Decking System Reinforced with Fiberglass Reinforced Thermoplastic Composites"; U.S. application Ser. No. 09/190,038, filed Nov. 12, 1998, of Thomas Gilbert, David Jacobson, and Rick Lappin, entitled "Shaped Polymeric Articles"; U.S. application Ser. No. 09/735,681, filed Dec. 13, 2000, of Thomas Gilbert, Kenneth Bosler and Steven Booz, entitled "Staggered Look Shake Siding", now U.S. Pat. No. 6,737,008, issued May 18, 2004; and U.S. application Ser. No. 11/247,620, filed Oct. 11, 2005, of Jong P. Jeng, entitled "Building Material Having a Fluorocarbon Based Capstock layer and Process of Manufacturing Same with Less Dimensional Distortion"; the entirety of which are incorporated herein by reference. The Examiner's attention is drawn to the prior art cited, or otherwise of record, in these related applications.

FIELD OF THE INVENTION

This invention relates to substantially hollow, closed, thin wall profile building materials having a low gloss textured pattern disposed continuously along one or more surfaces thereof.

BACKGROUND OF THE INVENTION

There have been a number of polymeric products made to look like natural wood for decking and siding applications. Such products are formed by extrusion and embossing processes, or by injection molding in a pattern mold to simulate a wood grain or pattern. Such products comprise a painted or otherwise "decorated" or printed pattern to simulate wood or other materials, such as marble or natural stone, for example. Such teachings are provided in Franco et al., US2005/0053767; Giacchino, US 2005/0127345; Barre et al., U.S. Pat. No. 5,331,602; Anstadt et al., U.S. Pat. No. 4,141,944; Bosler, U.S. Pat. Nos. 5,906,840; 5,314,325, 6,823,794 and 6,641,384; Cameron et al., U.S. Pat. No. 5,053,176; Dorchester et al., U.S. Pat. Nos. 5,866,054 and 5,869,176; Saloom, U.S. Pat. No. 5,387,381; and Soda et al., U.S. Pat. No. 3,936,518, which are hereby incorporated by reference. Most of these disclosures, other than the Bosler patents, relate to the use of embossing rolls located immediately downstream of the extrusion die. The embossing operation is designed to emboss the surface configuration, or provide ornamentation onto the capstock layer side of a plastic sheet. The embossing rolls apply tension to the sheet of plastic to draw the sheet of plastic down to a particular dimension. Following embossing, the embossed sheet is typically preformed in a die into a rough version of a siding profile. See, for example, Dorchester et al. U.S. Pat. No. 5,869,176, at col. 6, lines 11-26. While siding can be embossed readily with good effect, the high pressure of embossing rolls is ill suited for hollow profiles, such as fence boards and hollow decking planks, which would likely collapse under such pressure.

Multiple hollow fence board products made of thermoplastic materials are available in the market. Present hollow, semi-hollow, thin walled fence boards made of polymer based materials (neat, composite, or with fillers) made in extrusion processes have a surface which is smooth or enhanced by longitudinal, machine- or extrusion-direction texture, lines, ribs, or depressions. Such products do not have the look of natural wood, such as softer areas indicative of environmental wear, or harder areas which are generally more resistant to environmental wear. These hard and soft areas form peaks and valleys on the natural wood board surface following natural wood patterns which do not always line up with the machine- or extrusion-direction of synthetically made materials. Furthermore, hollow, thin wall fence board products currently available in the market exhibit a high surface gloss which reveals the true character of this material, and often make them undesirable on aesthetic grounds.

Continuous and semi-continuous processes for creating patterns on extruded plastic sheets have been used in the building components industry for a number of years. Some prior systems have disclosed rigid linked patterns for forming shaped impressions in an extruded sheet material. Unfortunately, such rigid shaped patterns tend to form unsightly horizontal seams in the material. Other systems have used pattern forms on rotating cylindrical drums. Although these processes are continuous, and do not produce horizontal seams, they often require expensive additional equipment and instrumentation to align the arcuate surface of the pattern with the relatively flat surface of the product, and to avoid, or correct, unwanted bowing of the product.

Because of the limitations on prior continuous processes, some manufacturers have opted for injection or blow molding building products one at a time. While such techniques can provide the desired detail in texture and surface finish, they are generally limited to product sizes of about 4-5 feet in length and provide product thicknesses which are practically limited to greater than about 0.080 inches. This is generally because of the difficulty associated with flowing hot viscous polymer through thin cross-sectional profiles in steel molds. Additionally, because of the known size limitations, the randomness of individual features on the surface of a molded product is limited. This results in only a relatively small number of pattern elements, such as shingles, being molded into the relatively small surface area. When several of these products are aligned side by side on a wall or roof of a building, for example, it is sometimes obvious to see the pattern repeated over and over again. Accordingly, there remains a need for improved vacuum embossing techniques for use in connection with extruded hollow thin wall profile products.

SUMMARY OF THE INVENTION

An exterior building product comprises, a polymeric unitary hollow member having a hollow interior portion and an exterior portion, and said polymeric unitary hollow member being closed along all exterior sides. According to an embodiment of the invention, the exterior sides are unitary with the hollow member, and are either seamless or pivot along a hinge and latch together.

A building product comprises a continuous length pattern of surface topography features embossed in exterior sides of a hollow member formed as a unitary extrudate. The invention further includes a process and apparatus for making the building product, wherein the exterior sides are supported to resist collapse thereof while heat and forces are applied during embossing, and the sides form a hollow unitary extrudate with ribs extending between the sides. According to an embodiment of the invention the unitary extrudate comprises a hollow extrudate wherein the interior of the hollow extrudate is supported by mandrels after extrusion and during embossing to resist collapse thereof. According to another embodiment, the extrudate has unitary ribs and is folded to form a hollow configuration with the ribs interlocked. Further embodiments of the invention pertain to a method of making a hollow building product having embossed exterior surface texture elements or features formed by embossing a continuous length of a hollow unitary extrudate while supporting the extrudate to resist collapse thereof while heat and forces are applied during embossing.

According to another embodiment of the invention, a continuous length pattern of surface topography features are embossed in exterior sides of a unitary extrudate, wherein the exterior sides having the surface topography features embossed therein are pivotable about a unitary hinge such that the exterior sides close and form a hollow unitary product. Further embodiments of the invention pertain to a unitary hollow product having extruded unitary interior reinforcing ribs. Further embodiments of the invention pertain to a continuous length pattern of embossed surface texture elements embossed lengthwise in a unitary product, wherein the surface texture elements or features are irregular in recessed depth, raised height and area pattern, to appear as randomly shaped surface texture elements or features occurring in respective natural materials. Further embodiments of the invention pertain to a hollow unitary product having unitary internal reinforcing ribs and unitary exterior surface topography features formed by embossing opposite sides of the hollow unitary product. In an embodiment of the present invention, an exterior building material is provided which includes a substantially hollow, closed, thin wall profile comprising a polymeric composition, the profile including an interior-facing surface portion and an exterior-facing surface portion. Upon the exterior-facing surface portion of the profile is presented a low gloss textured pattern disposed continuously along the exterior-facing surface portion. The low gloss textured pattern has a gloss level of less than about 50 on a 60° glossmeter, and has at least one cross-machine direction textured pattern element.

A further embodiment of the present invention provides an apparatus and a method of making an exterior building material comprising extruding a first polymeric composition including an additive and a colorant through a die to form a polymeric profile having a substantially closed, hollow shaped form; supporting an internal surface of said hollow shaped form with a mandrel; vacuum embossing the polymeric profile on a flexible rotating belt to form a textured pattern, said textured pattern disposed on an exterior surface of said polymeric profile; whereby said mandrel supports said internal surface of the hollow shaped form against a collapsing force while also assisting in providing a better vacuum seal. Following the vacuum embossing step, the embossed profile is calibrated, cooled and cut.

A further embodiment of the present invention employs a hollow extrudate supported internally by one or more mandrels, each preferably a floating mandrel, such as a PTFE or fluorocarbon resin coated steel mandrel or a unitary PTFE or fluorocarbon mandrel that is solid or hollow, and which is disposed inside the extruded soft profile of the extrudate. The preferred floating mandrel is a rigid, low friction, internal support, which prevents the extruded shape from collapsing and prevents the rubber or silicone belt from sagging and breaking its vacuum seal with its underlying perforated metal belt. The floating mandrel is preferably disposed between the extruder and the end of the embossing step, more preferably, from the beginning of the embossing step to about the location of the vacuum chamber or vacuum boxes. The vacuum boxes can thereafter assist in keeping the outer wall of the extruder profile and the silicone belt in close proximity to the perforated metal belt by vacuum pressure.

In a further embodiment of the present invention, a continuous method of making an exterior building material is provided. The method includes the steps of extruding a first polymeric composition including adding a colorant through a die to form a polymeric sheet; vacuum embossing the polymeric sheet on a flexible, rotating belt to form a low gloss texture pattern of about 2-20 feet in length, the textured pattern disposed on the polymeric sheet and having a gloss level of less than about 50, and more preferably 30 or less, on a 60° glossmeter. The textured pattern includes at least one textured element disposed in a cross-machine direction. The process further includes forming the embossed polymeric sheet into a closed, hollow shaped article; calibrating the shaped article; cooling the calibrated and shaped polymeric article; and cutting said cooled and calibrated shaped polymeric article.

In still a further embodiment of the present invention, an exterior building material comprising first and second substantially hollow polymeric shell portions are joined together by a hinge and fastened together by fastening means to form a substantially hollow thin wall polymeric article. The polymeric article has a low gloss simulated wood grain disposed on an exterior-facing surface portion thereof.

In yet another embodiment of the present invention, an extruded product comprising an elongated member having a first side comprising a capstock layer; and a second side comprising one or more male fastening members disposed along one lateral side of said second side, and one or more female fastening members disposed along an opposite lateral side of said second side; said polymeric member being foldable along a central, longitudinal axis so as to connect corresponding ones of said male and female fastening members together to form a hollow, closed, thin wall building material having generally a length of about 2-20 feet. These male-female connections are made while the polymeric material is still hot, so as to allow the male and female members to melt-bond together, or these connections are joined after cooling to form a mechanical joint or supporting structure.

In a further embodiment of the invention, a continuous method of making an exterior building material is provided in which a first polymeric composition is extruded through a die to form a polymeric profile having a form selected from the group consisting of: shells, a substantially closed, hollow shape, and a sheet. The polymeric profile is then vacuum embossed on a flexible rotating belt to form a low gloss textured pattern of about 2-20 feet in length, the textured pattern disposed on said polymeric sheet having a gloss level of less than about 50 on a 60° glossmeter, and having at least one textured element disposed in a cross-machine direction. The embossed, polymeric profile is then formed, calibrated and cooled prior to cutting the formed, cooled and calibrated profile.

The preferred extruded products of this invention have a hollow, thin wall having a thickness of about 0.005-0.25 inches (0.127-6.35 mm), preferably, less than about 0.100 inches, and more preferably, about 0.055-0.080 inches.

BRIEF DESCRIPTION OF THE DRAWINGS

The accompanying drawings illustrate preferred embodiments of the invention as well as other information pertinent to the disclosure in which.

DETAILED DESCRIPTION OF THE INVENTION

Introduction

The present invention is designed to make exterior building materials, such as hollow or semi-hollow (hereinafter just "hollow") fence boards, decking, window frames, door skins and ceiling tiles or panels and some siding and roofing products which have improved natural surfaces, such as surfaces resembling natural wood, including texture, grain pattern, colorant pattern and low gloss. The proposed combination of extrusion processing with embossing, such as, by continuous vacuum embossing processes, is capable of enhancing product appearance by applying a low gloss pattern of about 2-20 feet in length in any direction, including a cross-extrusion or cross-machine direction, to a thin wall product surface to emulate a natural texture. Furthermore, combining thermoplastic materials with colorants and streaker pigments, for example, or a combination of extrusion processes with inline decorating processes, such as printing, adds grain patterns as a final requisite of a natural wood appearance. Finally, by producing building materials having a hollow profile, posts and rails and fence boards and decking planks are made from polymeric materials inexpensively, but yet have surface texture, grain pattern and low gloss resembling natural wood.

The present invention relates to methods of producing exterior building materials having substantially hollow configurations, preferably with shaped profiles and methods of manufacturing the same. As used herein, the term "embossing" means a mechanical or chemical process that puts texture into an otherwise smooth finish. The term "gloss" is a measurement of the reflection of light off a finished product at a given angle of incidence and reflection. Sometimes measured using a glossmeter, it is expressed as a numerical reading. The higher the gloss level, the shinier the surface. The term "matte" refers to low gloss or an absence of gloss. Also as used herein, the term "grain" means the direction, size, arrangement and appearance of fibers or patterns in a wood-like material, or the simulation thereof. As used herein, the terms "heat deflection temperature" is the temperature at which a polymeric material deflects 0.010 in. under a load of 66 or 164 psi, as defined in ASTM test D 648. Also as used herein, the term "polymeric material" shall mean polymeric compositions which includes but is not limited to, compositions having, additives, such as ultra-violet light stabilizers, fillers, plasticizers, tints, and other additives, such as glass or wood fiber. The term "molded" means any number of processes, or combinations thereof, for forming an impression in a polymeric material, including compression molding, transfer molding, injection molding, blow molding, autoclave molding, contact molding, pressure bag molding, vacuum bag molding, deep draw molding, lay-up molding and spray molding, etc.

Process and Apparatus Introduction

Figure 15:
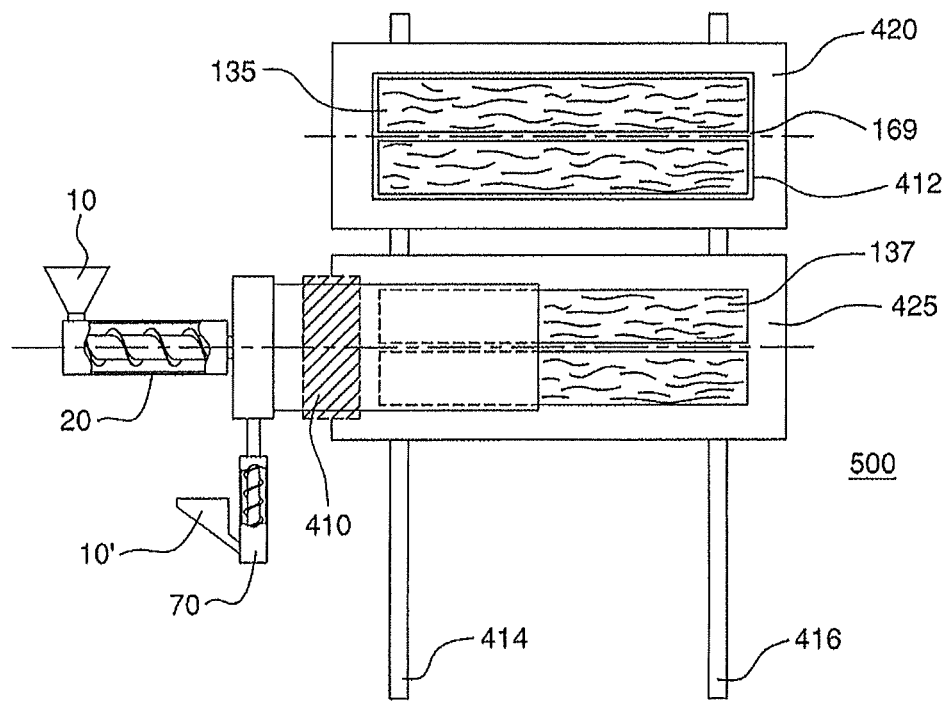
FIG. 15 is a top plan view of the extrusion, paint application, and vacuum forming chambers of a fifth preferred apparatus for vacuum forming polymeric material according to this invention.
Figure 16:
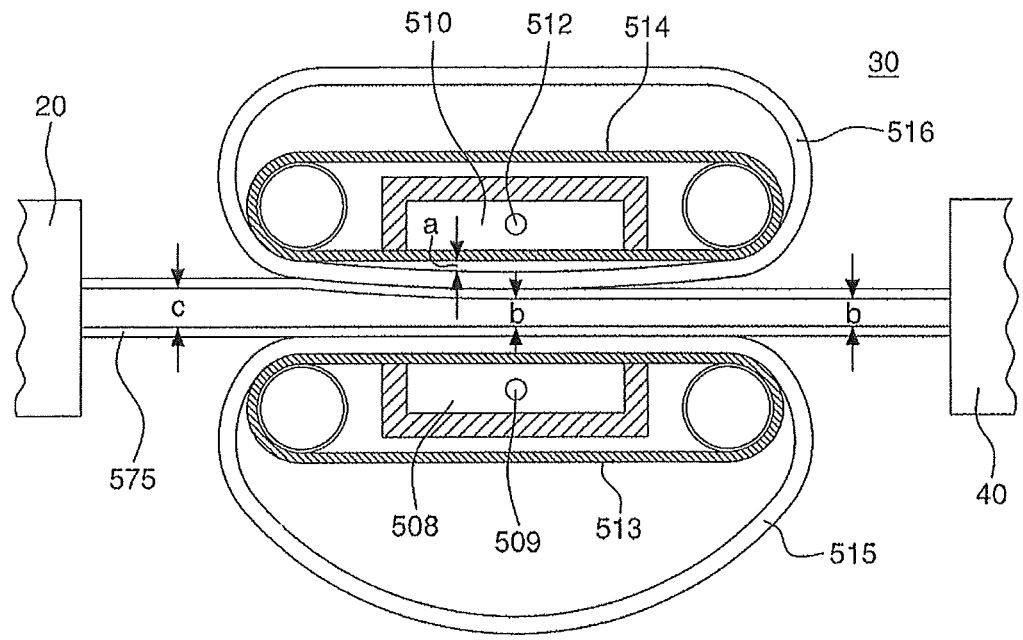
FIG. 16 is a diagrammatic side plan view of the preferred vacuum embosser showing a loss of vacuum and product collapse.
Figure 17:
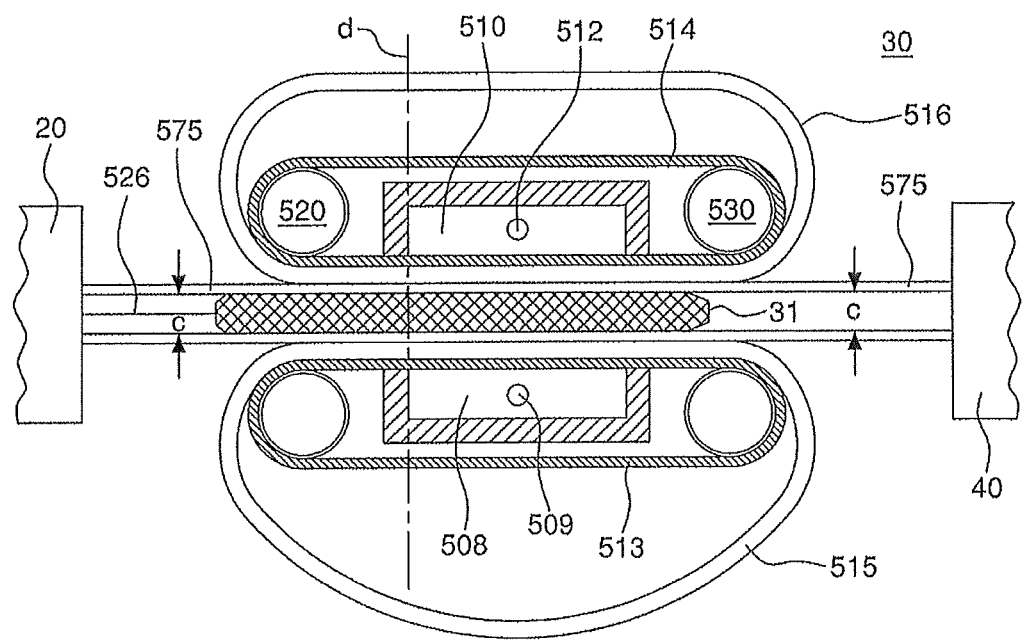
FIG. 17 is a diagrammatic side plan view of the vacuum embosser of FIG. 16 following the introduction of a floating mandrel.

The preferred method of this invention is best understood by reference to the FIGS. 1-17, which will now be described. This method provides a first apparatus 100, FIG. 1, for the continuous vacuum forming of a hot polymeric material, including a thermoplastic or thermosetting composition, for example, such as polyvinyl chloride ("PVC"), polyethylene, polypropylene, polyurethane, epoxy, polyester, polycarbonate, etc., or other similar materials. The hot polymeric material, as shown in FIGS. 1, 4, 9 and 12, or the hot polymeric material shown in FIGS. 15-17 is first extruded from an extruder 20, and is then disposed upon a flexible rotating belt or vacuum embosser 30 and between a bottom mold belt 515 and a top mold belt 516, in FIGS. 1, 4, 9, 12, 16 and 17. Each mold belt 516 and 515 of the embosser 30 is suspended, as shown in FIG. 17, between a first drive roller 520 and a second idle roller 530 in a substantially horizontal direction. The embosser 30 preferably contains a porous drive belt 513, 514, FIGS. 16 and 17, to facilitate flexing of its rotating belt and the passing of air or vacuum pressure. It is most preferably made from stainless steel mesh or other open forms, such as interlocking metal or polymer sections, chain link, screen or hinged segments of corrosion resistant material. Each of the rotating mold belts 515, 516 of the embosser 30 also includes a softer, resilient mold belt 515, 516, one or both containing a mold impression, such as a continuous length pattern of surface texture elements or features, such as, a wood grain impression, or a similar impression for producing a low gloss embossed textured surface, 135, 235 and 335 in FIGS. 3, 6, 11, 13, 14 and 15, respectively. The resilient mold belt 515, 516 also includes a plurality of apertures therethrough for passing air, such as an applied vacuum pressure. Such details of vacuum embossing are further disclosed in Bosler, U.S. Pat. Nos. 5,906,840; 5,314,325, 6,823,794 and 6,641,384.

The first and second rollers 520, 530 of each flexible rotating mold belt 516 and 515 of the embosser 30 are spaced apart from one another in a generally horizontal direction such that the rotating belt 516, 515 extends between them, and forms a substantially flat forming surface. The mold belt 516 and 515 is preferably made of a resilient flexible material such as rubber, or rubber-like material, such as silicone or synthetic rubber.

Each mold belt 515 and 516 and corresponding drive belt 513, 514 are frictionally or mechanically engaged so that, by driving the drive belt 513, 514 with drive axle and drive roller 520, the corresponding mold belt 515 and 516 moves as well. The mold impression of the mold belt 516 and 515 substantially retains its shape as it spins, or stretches slightly, so there is no need for multiple sections and seams. The continuous mold impression preferably is a continuous length pattern of surface texture elements or features on a corresponding continuous mold belt 516 and 515. The continuous mold impression is transferred by being impressed by continuous vacuum embossing into the opposite sides of the product 60 in FIGS. 1, 3 and 3A, and the product 60' 3B, the product 160 in FIGS. 4, 6, 8 and 14, the product 160' in FIG. 14A, the product 260 in FIGS. 9, 11 and 11A, and the product 260' in FIG. 11B, and the product 360 in FIGS. 12 and 13.

Figure 4:
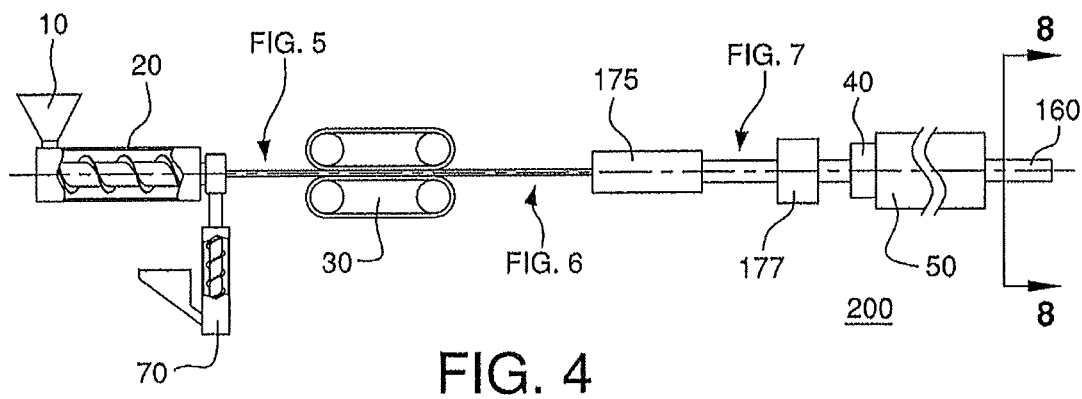
FIG. 4 is a partial diagrammatic side plan view of a second apparatus for extruding and continuously vacuum forming the polymeric material of this invention.
Figure 5:
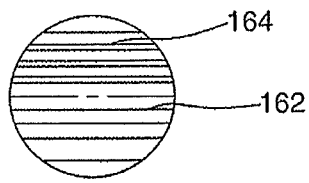
FIG. 5 is an enlarged view of the extruded material as it exits the extruder of the apparatus of FIG. 4.
Figure 14:
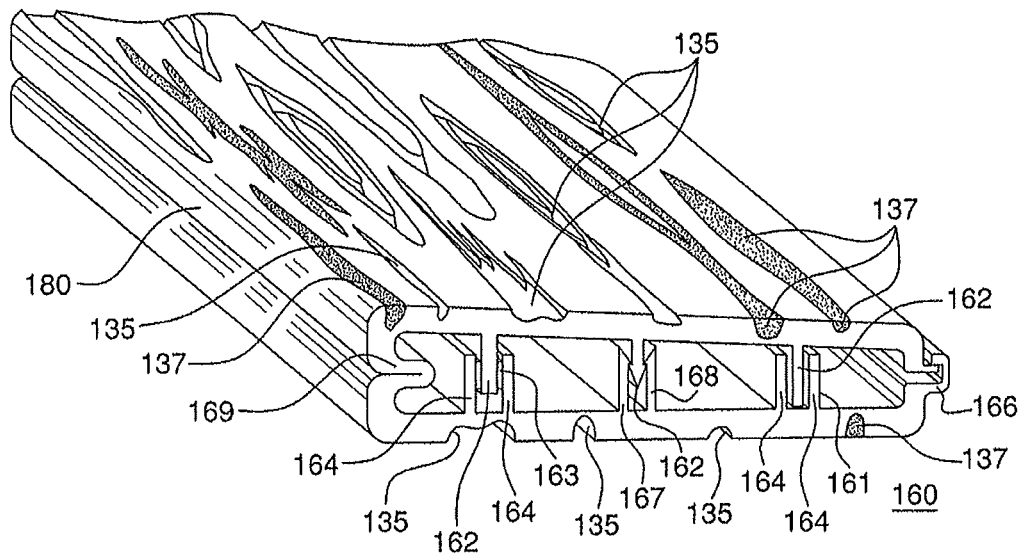
FIG. 14 is a partial cross-sectional fence board of the present invention showing its hollow profile and alternative constructions for one or more interlocking internal strengthening ribs, and textured surface portions pivotally connected along a hinge, and interlocked along a latch.
Figure 14A:
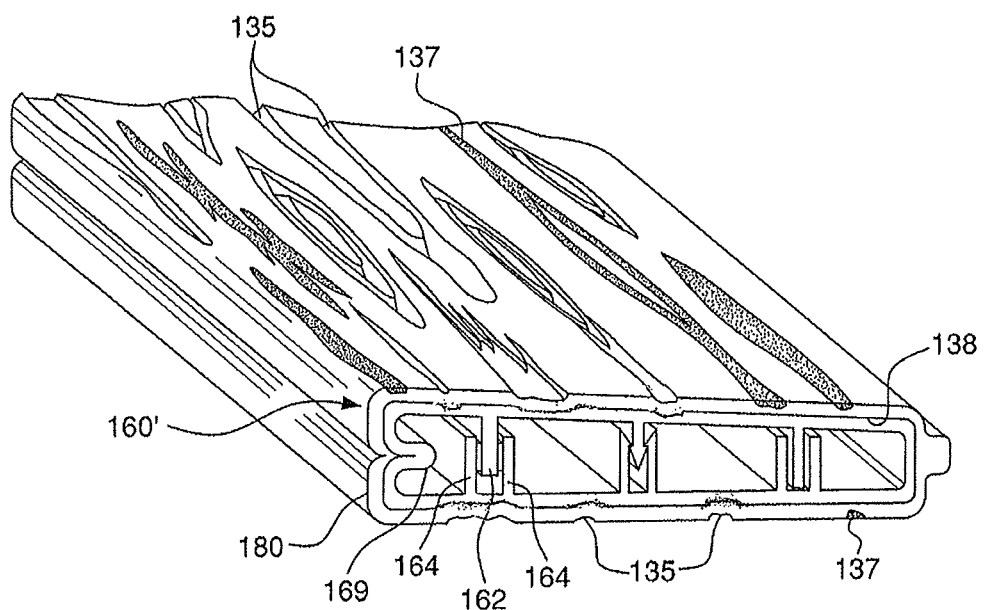
FIG. 14A is a view of a product similar to that of FIG. 14 and further having a capstock layer.

In FIG. 17, vacuum boxes 508, 510 cooperate with a plurality of apertures in the respective mold belts 516 and 515 and the open spaces in the corresponding drive belt 513, 514 to draw a vacuum against the bottom surface and the top surface, respectively, of the extruded hollow profile 575 having the mandrel 31, or alternatively, as shown in FIGS. 4, 14 and 14A to draw a vacuum against the open and foldable, extruded profile formed without a mandrel 31. The mold belts 515 and 516 optionally includes longitudinal and lateral sections impregnated with polymeric or resilient rubber-like material which is relatively impervious to air flow. Such sections are provided with a plurality of vacuum openings, such as circles, or rectangles, etc., through which air can pass through and be drawn by vacuum through the open weave metallic material of the preferred drive belt 513, 514. Preferably the plurality of apertures defined in the mold belt 516 and 515 are in open communication with respect to the vacuum sections of the drive belts 513, 514. This facilitates drawing the hot extruded profile 575 of the extrudate material by vacuum against the mold impression, and by a vacuum provided by the vacuum boxes 508, 510. The hot plastic, while retaining an elevated temperature resulting from the heat of extrusion so as to remain, at least at, and preferably above its heat deflection temperature, is drawn onto the mold impression, and surface texture of fine detail is vacuum formed by being pressed into a central region of the polymeric profile 575 of the material. The lateral edge portions of the polymeric material may or may not be impressed with vacuum formed surface texture. A suitable support belt and vacuum manifold are disclosed in U.S. Pat. No. 5,906,840.

The present invention further relates to creating patterns such as variegated colors or wood grains on hollow-profile building materials, for example, decking, fencing posts, rails, boards, railing, siding and window framing applications, to name a few. This invention may employ sprayed, painted, coated or printed capstock layers and top coat layers having a total thickness of preferably less than 4 mils, and more preferably 1 mil or less, which have the ability to perform well long term, and have ample weathering performance, mildew resistance, and dirt repellency, while simultaneously providing good adherence to thermoplastic substrates, such as those manufactured with PVC, polyethylene, polystyrene, polypropylene, either in virgin or recycled form.

Figure 1:
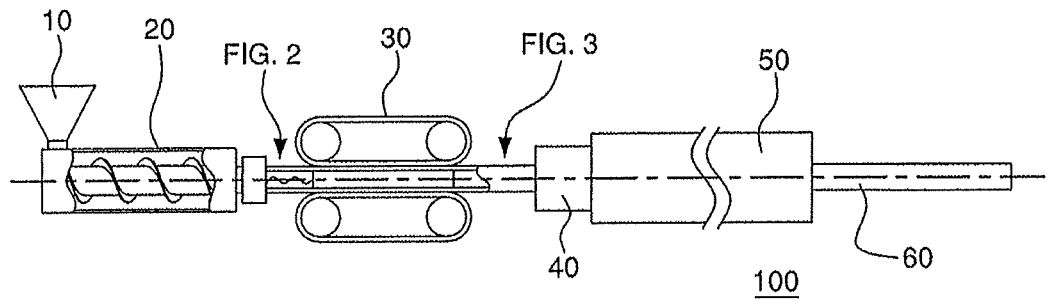
FIG. 1 is a partial diagrammatic side plan view of a first apparatus for extruding and continuously vacuum forming a polymeric material of this invention.

With reference to the Figures, and particularly FIG. 1 thereof, there is shown a first manufacturing process line 100 for making the building materials of this invention. The manufacturing process begins as bulk resin is unloaded from railroad cars to a conveying system, into huge silos holding up to 250,000 pounds or more of material. From these main storage silos, resin is conveyed to a blender, where ingredients such as calcium carbonate, $TiO_2$ and other additives and micro-ingredients, are added to create the processing compound. This precise measuring of ingredients and uniform blending under proper heating conditions can be important to the production of uniform, high quality building products.

After blending, the compound is conveyed to the extruder 20 where it is carefully metered so a consistent amount of material enters the hopper 10. The extrusion operation is a process in which thermoplastic resin is pushed through a heated barrel and die by one or more large, precisely tooled screws. As they turn, the screws knead and thoroughly mix the thermoplastic compound and additives such as UV stabilizers, plasticizers, blowing agents, copolymers, and/or other extrudable thermosetting resins. Both the screws and the barrel of the extruder are preferably heated which melts the resin and makes it easier to mix and push. The heat (300 to 400° F. for PVC), also accelerates the physical reaction (fusion) between resin and the micro-ingredients in the compound.

Most building products, such as siding, are extruded with twin-screw extruders. Twin-screw extrusion is preferable to single-screw extrusion because it heats and distributes material more evenly, resulting in a product with better physical properties. As the resin compound is forced ahead of the rotating screws, the very tight tolerances in the double barrel promote complete fusion of the ingredients. Color concentrate is added at the extruder, which helps to produce a rich, durable, all the way through color, in each exterior building product.

Co-extrusion, is used to join two flows of molten resin compound from two extruders 20 and 70 in a single die to produce an extrudate of a single polymeric sheet comprising two layers of materials, such as a substrate and a "capstock layer." As used herein, the term "capstock layer" refers to a thin protective layer added to some exterior building products to improve weatherability and color retention. The capstock layer comprises either a single layer of polymeric material, or comprises a multilayer having two or more polymeric layers, each of which is extruded one over the other, either by coextrusion in a single extruder, or by separate extrusion in a number of successive extruders. The one or more layers comprising the capstock layer are unfoamed and are preferably nonporous and selected to provide a visually aesthetic, finished surface and which comprise polymer compatible additives imparting chemical and mechanical properties, for example, water and moisture resistance, flame resistance, ultraviolet resistance, surface texture or finish, colorfastness, toughness, solar reflectance, wear resistance, impact resistance and stain resistance. In an embodiment of the invention, one or more layers of a multilayer capstock layer comprises a matrix of translucent resin or transparent polycarbonate for example, and an alternative embodiment of an accent color streakers of polymeric colorant in opaque and transparent or translucent layers comprising the capstock layer. Typically, the capstock layer material comprises acrylic-containing resin, such as AES, ASA, or alternatively, polyethylene or polypropylene. Capstock layer co-extrusion requires a processing window due to the difference in coefficient of linear thermal expansion rates between the capstock layer and base or substrate. Missing this window often leads to unacceptable dimensional distortion or bowing of the panel, lineal, lintel or framing member, fence or board, for example.

Figure 2:
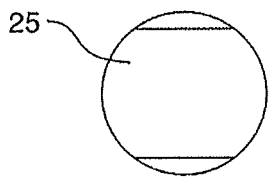
FIG. 2 is an enlarged view of the extruded polymeric material following the extrusion step of the apparatus of FIG. 1.
Figure 3:
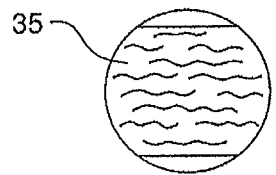
FIG. 3 is an enlarged view of the embossed polymeric material as it exits the vacuum embosser of the apparatus of FIG. 1.

In FIGS. 1 and 17, as the extrudate exits the extruder 20, the polymeric sheet or profile 575 is still very hot, nearly molten, and has a glossy or smooth extruded appearance 25 of its surface as shown in FIG. 2 (e.g., over 50 gloss reading on a 60° glossmeter measuring reflection at a 60 degree angle). The gloss of the surface will have slight manufacturing imperfections, such as scratches and faint lengthwise straight lines imparted to the product by slight surface imperfections in the extrusion die. Such slight imperfections detract from the appearance of the surface, and leads to rejection of pieces of the products, which differ in gloss when compared against one another or which are not perfect in terms of gloss appearance. Although the extrusion process enables manufacture of straight grooves of constant width and depth or raised ridges of constant width and height, such does not duplicate the random surface features appearing on natural materials, i.e. materials occurring in nature. According to an embodiment of the invention, between the extruder 20 and the calibration die 40 is located the mold belts 516 and 515 of the vacuum embosser 30 (collectively, vacuum embossing apparatus or step). Depending on the rollers or belts, fencing, and decking, products and accessories are typically embossed in either rough cedar, wood grain or smooth or brushed low gloss surface finishes that look like raised grain wood, rough hewn or split wood, or sanded, sealed and painted wood. For example, natural wood fence boards are kiln dried or air dried over time and further are worn by the weather, all of which contribute to the wood surface becoming a random or irregular pattern of striations of recessed soft wood grain, and striations of harder wood grain that appear to be raised relative to the soft wood grain striations. Painted fence boards further have such striations covered with fresh paint, which are simulated by an embodiment of the invention, as described with reference to FIGS. 3 and 3B. Hewn or split wood fence boards have further surface texture elements or features that are indicative of hewn or split rough wood surfaces, as described with reference to FIGS. 3, 3A, 14 and 14A, Some wood varieties, such as split cedar and Douglas fir have rough checks in the wood surface that reappear over time, after being sanded smooth or painted. Usually, such wood surfaces are unsanded and unpainted, since the rough surface checks reappear as defects in a sanded or painted surface. For example, FIG. 3A discloses embossed surface texture 135, which comprises embossed surface texture elements or features, which are irregular in recessed depth, raised height and area pattern, to appear as randomly shaped surface texture elements or features occurring in respective natural materials.

Figure 3A:
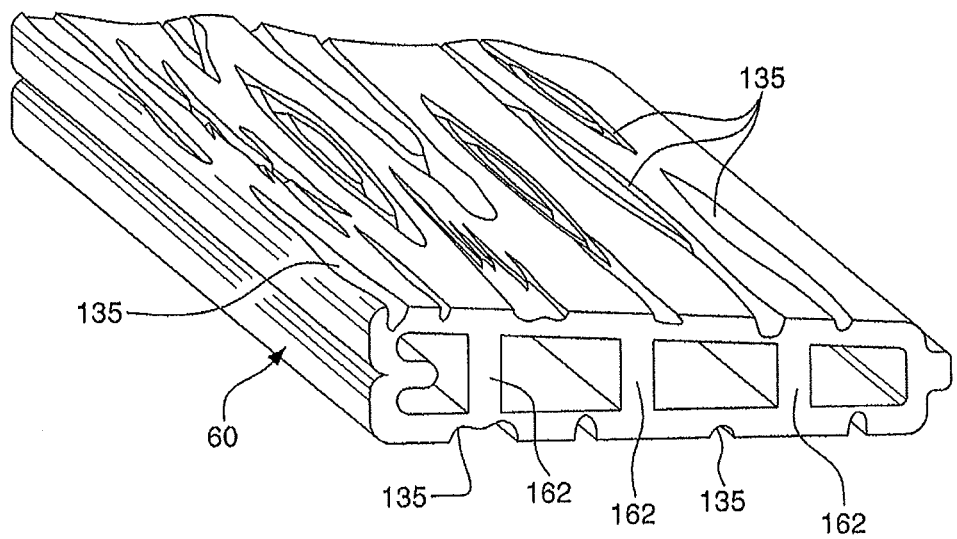
FIG. 3A is a schematic view of a seamless hollow product in the form of a board having one or more unitary seamless interior reinforcement ribs.
Figure 3B:
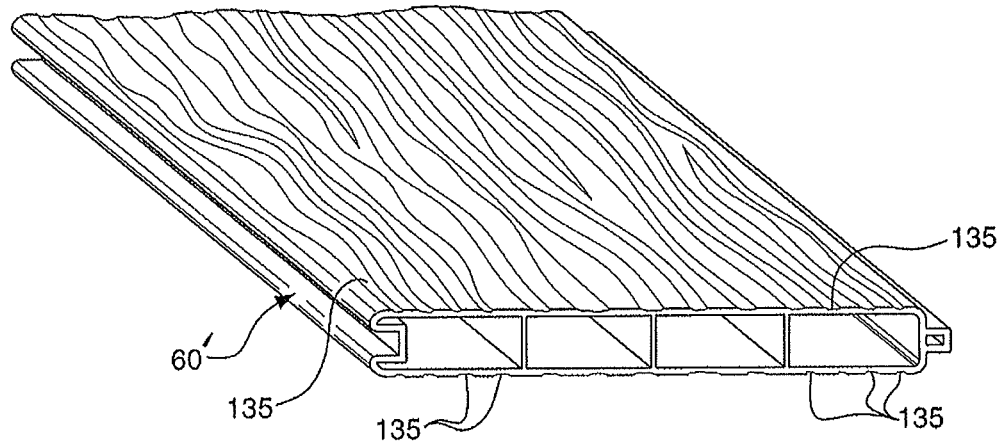
FIG. 3B is a schematic view of another seamless hollow product in the form of a board having one or more unitary seamless interior reinforcing ribs.
Figure 7:
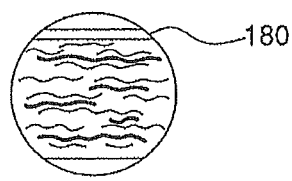
FIG. 7 is an enlarged view of the folded sheet after it exits the folding die of the apparatus of FIG. 4.
Figure 11A:
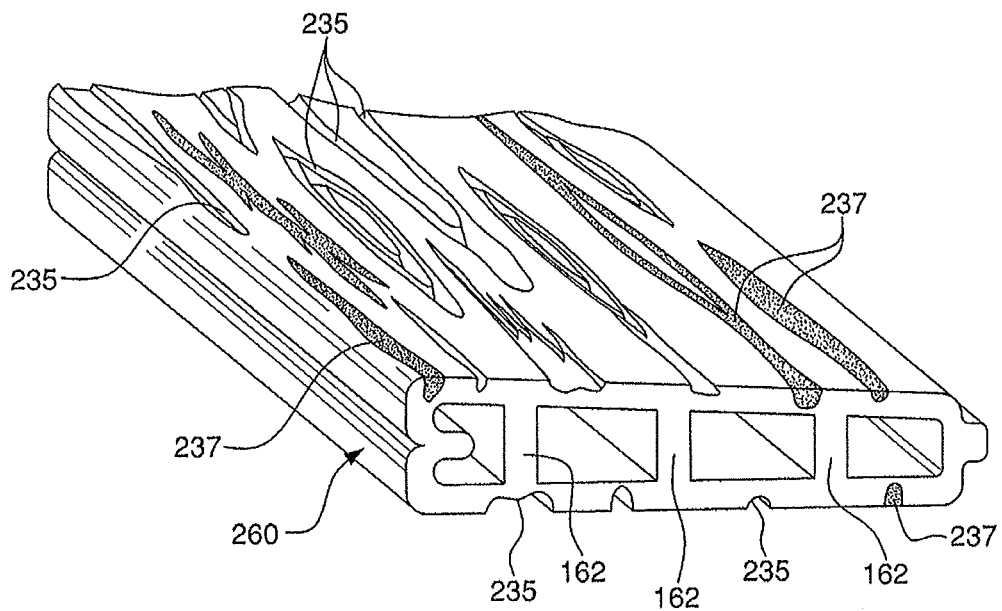
FIG. 11A is a schematic view of a seamless hollow product in the form of a board having one or more unitary seamless interior reinforcement ribs.

FIG. 3A illustrates an extruded and embossed product 60 in the absence of a capstock layer having an embossed surface texture 135 simulating an unpainted low gloss textured rough wood surface, produced by the embosser 30. FIG. 11A discloses similar surface texture 235, as well as, streaker grain color 237. FIG. 3B illustrates an extruded and embossed product 60' in the absence of a capstock layer having an embossed surface texture 135 simulating a low gloss textured wood grain pattern having raised and recessed wood grain striations that simulate unpainted or painted surfaces depending upon the color, such as, wood color or paint color thereof. Another advantage results from the embossing process to reconfigure the gloss of surface 25 and the surface defects produced by the extrusion process by embossing the same to form a matte or low gloss surface texture 135. Further, U.S. Pat. No. 6,752,941 discloses the addition of accent color pellets and a streaker concentrate, which is added to the hopper 10 to produce a dispersion of accent color in an extruded product. For example, FIG. 11A discloses a product 260, in the absence of a capstock layer and having the embossed surface texture 235 and the accent color in the form of a colorant streaker pattern of grain color 237 produced by the extruder 20. Further, for example, FIG. 14 discloses a product 160, respectively, in the absence of a capstock layer having the embossed surface texture 135 and a colorant streaker pattern of grain color 137. FIG. 14A discloses a product 160' having a capstock layer 138 and the embossed surface texture 135 and a colorant streaker pattern of grain color 137 in the capstock layer 138.

Some building products 60, 60', 160, 160', 260, 260' and 360 are treated with a post-forming step or steps. Equipment, such as vacuum sizers of the calibration die 40 and post-formers, provide greater consistency in post-formed thickness and profile. Post-formed locking devices in siding, for example, disclosed by U.S. Pat. Nos. 6,319,456 and 6,737,008, comprise tighter tolerances and more intricate interlocking structures, which result in higher wind load ratings. Post-forming operations further include the calibration dies 40 including but not limited to, pre-sizers and vacuum sizers and shaping dies (collectively, 40) prior to the cooling tank 50 to create distinctive profiles and a wide range of sizes for products 60, 60', 160, 160', 260, 260' and 360. In a vacuum sizer as the calibration die 40, the product is given a crisp finish profile. In FIG. 3B, tongue and groove edges along opposite side edges of a simulated board 60' are heated at least to its heat deflection temperature, alternatively, at least to its vicat softening point temperature, sized and straightened in the calibration dies 40, for example, to obtain accurate dimensions of tongue and groove joint sections that interengage when a number of simulated boards 60' are installed side by side and interlocked by tongue and groove joints, for example, to construct a fence or a deck. Alternatively, the opposite side edges 166, 169 of a simulated board 160 or 160' are heated at least to its heat deflection temperature, alternatively, at least to its vicat softening point temperature, sized and straightened in the calibration dies 40, for example, to obtain accurate dimensions and to melt bond the joint 166.

The cooling tank 50 is located after any post-forming operation. Once the hot sheet, including an optional, i.e. alternative embodiment of, a painted and/or printed layer over the polymeric substrate, is introduced into the cooling tank 50, the product temperature quickly drops below its "heat deflection temperature" and the final shape sets. An embodiment of the invention comprises a gravure roll coater or other form of a printer 311, FIG. 12, located between the vacuum embosser 30 and the cooling tank 50. The painted and/or printed layer dries separately from the cooling tank 50 when painted and/or printed either before or after the hot sheet is cooled in the cooling tank 50.

Figure 12:
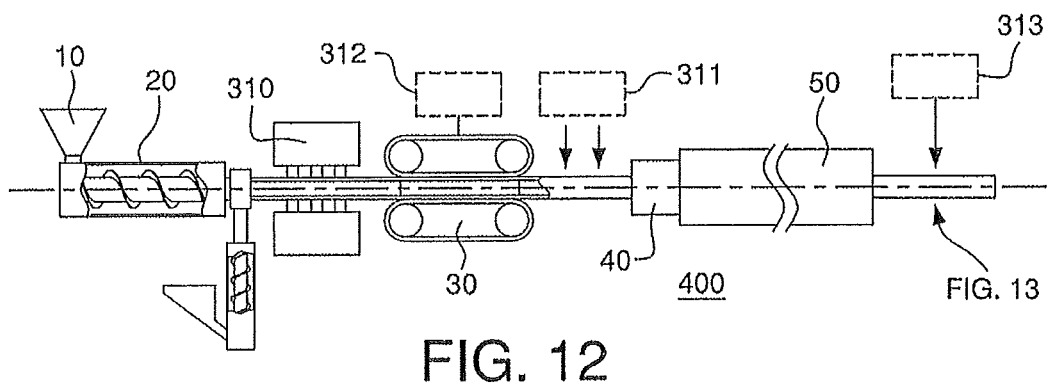
FIG. 12 is a partial diagrammatic side plan view of a fourth apparatus for extruding and continuously vacuum forming the polymeric material of this invention.

A coating step comprises printing by a gravure roll coater ("print roll") comprising an exemplary embodiment of the printer 311, 312 or 313, FIG. 12, which are provided and located before or after the embossing step by the vacuum embosser 30, or before or after the vacuum sizer of the calibration die 40, for example. Preferably the capstock layer coating step occurs prior to water cooling by the cooling tank 50, so that the substrate's heat of extrusion is used to dry the capstock layer coating. In another preferred embodiment, the coating step comprises printing patterns of colors by one or more computer controlled ink-jet printers 311, 312 or 313, FIG. 12, that performs depositing one or more print layers in succession, such as a 100% opaque capstock layer followed by depositing print layers comprising one, two or three variegated layers that dry prior to water cooling.

After passing through the cooling tank 50, the substrate and alternative embodiments of a painted or printed layers and/or alternative embodiments of a capstock layer are optionally punched with openings, not shown, at precise intervals for insertion of metal supporting rods, nails or fasteners and the like. Finally, the product 60 is cut to length at cut off, inspected and packaged.

Variegated Surfaces and Decoration

The embodiments of the invention comprise one or more spraying, painting, and/or printing steps ("coating step") disclosed in FIG. 12, for example, which follow the extrusion step or following the alternative embodiment of a co-extrusion step to form both a capstock layer and one or more top coat layers that provide a variegated pattern, textured and with or without a colored pattern, to the alternative building material product 60, 60', 160, 160', 260, 260' and 360. The variegated textured pattern comprises a wood grain in one or more coating layers. The coating step includes but is not limited to, hot painting, thermal spraying, paint spraying, fusion coating, inkjet printing and gravure roll coating, for example. A gravure roll coater 311, FIG. 12, is located between the vacuum embosser 30 and the cooling tank 50 in the preferred manufacturing schematic of FIG. 1 to perform the coating step.

The inks, pigments, coatings or paints create variegated wood grains and colors applied by direct printing or coating, for example, is provided without collapsing distortion or bending of thin panels, long decking planks, or intricate window lineal, lintel or framing member, fences. Preferably, the total coating thickness will be less than 4 mils, and preferably, 1 mil or less, compared to existing co-extruded ASA capstock layers of about 4-6 mils, used in PVC siding, for example.

While various coatings are employed in connection with variegated surfaces of this invention, those including PVC, polyethylene, polypropylene, ASA and other acrylic-based compositions and fluorocarbon resins, such as, polytetrafluorethylene, PTFE, PFA, ETFE, ECTFE, FEP, polyvinylidene fluoride, PVDF, PPS, EFEP, TEFLON®, and other thermoplastic or thermosetting resins, are desirable. These compositions are applied to thermoplastic or thermosetting sheets or construction materials by such techniques as thermal spraying, paint spraying, fusion coatings, inkjet printing, and gravure roll printing, for example.

One method for making the capstock layer and the first, second, and subsequent top coat layers of the variegated building products of this invention, employs a water base emulsion ink or paint containing a copolymer of PVDF and Hexa Fluoro PVDF that is polymerized in the presence of an acrylic component. The preferred coating is sold under the trademark Kynar® and is provided by Arkema.

The hollow building product of this invention also relates to an article that has a variegated effect appearance. The article comprises a mixture of a substantially non-opaque (i.e., neither transparent nor translucent) polymer matrix, and color particles having different melt flow properties from the polymer matrix. The initially discrete color particles are suspended in the non-opaque matrix, and streak out during processing, acting as accent color pellets or masses. By "streak out" is meant that the color particles extend and form variegated lines and shades of color for example the colorant streaker pattern of grain color or grain indicia 137. The transparency or translucency of the non-opaque matrix adds a depth or dimension to the variegated appearance. For exterior applications, at least the outermost layer, which would be exposed to the environment, is protected by appropriate antioxidants, thermal stabilizers, photostabilizers, etc.

The melt index (MI) of a polymer resin is a measurement of processability under low shear rate conditions. The MI is determined by ASTM D-1238 (for example, Condition E for PVC) (190° C./2.16 kg). For instance, the MI of the polyolefins is generally between about 0.2 dg/min, and about 100 dg/min, preferably, between about 1 dg/min and about 10 dg/min, and most preferably, between about 2 dg/min and about 8 dg/min. The MI of the polymer resins are measured using ASTM D-1238.

When thermoplastic materials are heated, the thermoplastic begins to soften, its physical properties changing in various ways. The temperature at which a measurable softening of the thermoplastic occurs when heated is, preferably, measured by the "vicat" method, and is referred to as the "vicat softening point temperature". Analogous or related temperatures are measured by other methods, resulting in other scales of temperature versus physical property, such as the heat deflection temperature, or the melt flow index. The vicat method and scale, preferred by the present inventors, is specified by ASTM-D-1525, from which the vicat softening point temperature referenced herein was obtained. The vicat softening point temperature indicates the softening temperature at which the resin begins to melt in response to increased temperature. The melt flow index is a measure of the viscosity of a resin when it has fully melted.

The transparent matrix material includes either a plurality of types of color particles and/or accent color pellets. The variations in color particle type include different colors of pellets, different sizes of pellets, different melt flow behavior of pellets, or pellets having different relative viscosities compared to the matrix polymer. The different colors will result in different sizes or shapes of streaks. The different viscosities will result in different lengths of streaks. The different kinds of pellets contribute to the complexity of the variegation obtainable with this invention, and to the aesthetics of simulation of a wood grain or a mineralogical veining effect for the finished article. Methods whereby the formation of the article are accomplished include for example, extrusion, molding, and injection molding.

Furthermore, an article made by the processes of the present invention alternatively comprises a plurality of variegation layers wherein each of the layers includes a transparent or semi-transparent matrix, and one or more kinds of accent color particles. The layers are formed, for example, by extrusion of individual layers followed by lamination or bonding to construct a multilayer article. Alternatively, the various layers are coextruded through, for example, a plural manifold die system to form the multilayer article in fewer steps. The articles of the present invention are provided with a transparent or translucent protective overlayer or capstock layer, by means of such as lamination, coextrusion or coating applications. The coating step includes but is not limited to, hot painting, thermal spraying, paint spraying, fusion coating, inkjet printing and gravure roll coating, for example. The article also includes a colored base layer, which color is at least partially visible through the non-opaque, transparent or translucent, matrix of the streaker-containing layer.

Different types of color particles include, for example, color, size and melt rheology, Different sizes will result in different widths or shapes of color streaks. Different melt rheology or viscosity during processing will yield different behaviors in streak flow. For example, lower viscosity streaker particles will stretch out more on processing. Larger particles produce wider streaks of variegation. Color particles with greater miscibility/compatibility with the matrix polymer will produce streaks having more diffuse boundaries.

The materials of this invention comprises various transparent or translucent matrices which are the same or different chemical families. The layers are selected for controlling other functionality required in the end product. The rheology of each transparent or translucent matrix are balanced for the given color particles contained therein. Each layer provides other functionality, such as, for example, stabilization and UV protection in the outer layers, chemical resistance, or resistance to dirt pickup.

An alternative embodiment of a transparent matrix comprises a transparent colorant. This transparent colorant could be a dye or a small particle pigment. The use of transparent color of a layer containing a transparent colorant provides a degree of freedom in imparting a desirable depth in appearance to the article. Also, a single color particle type is used in each transparent matrix, or a given layer comprises more than one kind of color particle.

The colored base or substrate layer comprises any material desired in making the article of the invention. For example, it comprises a filled base polymer of less weatherable materials that are protected by the upper layers which also contribute to a desirable aesthetic. An embodiment of the base or substrate itself comprises a plurality of layers. In one instance, it comprises a colored surface layer adjacent to the variegation layers, with a layer containing fillers beneath. The base or substrate layers contribute substantially to the bulk mechanical properties of the article, while the variegation layers provide a desirable appearance.

Processes and Apparatus Details

In a first embodiment of the present invention, a continuous length hollow extrudate 60 or 60', FIG. 3A or FIG. 3B, with a hollow, closed thin wall profile is extruded by extruder 20, shown in FIG. 1. A smooth, extruded glossy outer surface 25, FIG. 2, of this hollow, continuous cross-section piece exits the die of the extruder 20. The extrudate profile is a hollow, closed thin wall profile in the absence of a capstock layer, which includes a thermoplastic material with additives for weatherability, durability, flame resistance and other desirable features for an exterior product. The die of the extruder 20 is equipped with interior pins or mandrels which are capable of forming the extrudate 60 or 60' with hollow lengthwise sections separated by continuous length, unitary internal ribs 162, FIG. 3A or 3B, within the hollow thin wall extrudate 60 or 60', the ribs 162 bridging between opposite interior lateral sides of the hollow thin wall extrudate 60 or 60' to support and resist collapsing forces, and to support and resist sagging from gravity before vacuum embossing. Floating mandrels 31 outside of the die are connected to the pins and mandrels inside the die by corresponding flexible, adjustable links or connections 526, FIG. 17, such as. braided steel wire, chain, cable or rope, for example, such that the mandrels 31 float at the ends of the links or connections 526 and remain inside corresponding interior sections of the extrudate. The corresponding one or more low friction (e.g., cast, molded or machined unitary PTFE or other fluoropolymers or metal coated with low friction PTFE resin or other fluoropolymers) mandrels 31, FIGS. 1, 9, 12 and 17, keep the hollow extrudate from collapsing under the applied heat and forces during vacuum embossing opposite sides of the hollow extrudate by the top mold belt 516 and by the bottom mold belt 515. Each floating mandrel 31 preferably extends within the vacuum embosser 30, preferably at least up through the leading edge of the vacuum boxes 508, 510. (Alternatively, the floating mandrel 31 could be used with a conventional roll embosser.) The floating mandrels 31, FIGS. 1, 9, 12 and 17, are surrounded by the interior surfaces of the respective hollow extrudate sections of the hollow extrudate 60' while the material is conveyed between the top mold belt 516 and bottom mold belt 515 of the vacuum embosser 30. The hollow extrudate sections slide over the low friction mandrels 31 while being transported through the embosser 30. The smooth profile extrudate from the extruder 20 undergoes embossing in the vacuum embosser 30, having one or more continuous rubbery mold belts comprising the lower mold belt 515 and the upper mold belt 516 where applicable, embossing a continuous patterned impression of controlled, low-gloss, pattern texture 135, 235, 335 in one or more sides (opposite sides) of the extrudate 60 or 60' having a hollow, closed thin wall profile of continuous length, and then cut to desired lengths of about 2-20 feet after emerging from a cooling tank 50. The preferred extruded products of this invention have a hollow, thin wall having a thickness of about 0.005-0.25 inches (0.127-6.35 mm), preferably, less than about 0.100 inches, and more preferably, about 0.070-0.090 inches.

Thin wall hollow profiles remain hot and soft during vacuum embossing. The upper silicone belt 516 of the vacuum embosser 30 is relatively heavy and tends to sag into the soft hollow profile, which is too thin to support the weight of the sagging silicone belt 516. This causes the top wall of the profile to collapse. This, in turn, creates a gap "a" between the silicone belt 516 and the perforated belt 514, releasing the vacuum. The result is poor product quality.

As shown in FIG. 16, without a mandrel to support the soft hollow extrudate, the thin wall of the profile 575, which is often less than 0.010 inches in thickness, can not support the weight of the upper silicone belt 516, and becomes vulnerable to the collapsing force of the effect of gravity on the upper belt 516. This can be demonstrated by looking at the internal cross-sectional dimension "c" of the profile defined along its inner edge. As the profile 575 is extruded, it has an internal dimension "c". Upon entering the vacuum embosser 30, the weight of the upper mold belt 516 is exerted on the upper wall of the profile 575, bending it downward to reduce the internal dimension to a smaller opening "b", which results in an unintentional distortion of the building product. Without support, the upper belt 516 tends to droop, causing a gap "a" to form between the resilient mold belt 516 and the porous drive belt 514. This gap "a" results in vacuum from the vacuum box 510 not being maintained. The loss of vacuum causes the perforated belt 514 to at least partially lose frictional contact with the silicone resilient belt 516. In addition, the weight of the resilient belt 516 is now fully on the thin wall soft profile 575, which results in its distortion. The loss of vacuum pressure also prevents the outer surface of the thin wall soft profile 575 from being impressed into the texture of the mold or resilient belt 516, which further results in a complete or partial loss of embossing pressure, and little or no resulting pattern. It also becomes difficult for the drive belt 514 to continue to frictionally drive the mold belt 516.

As shown in FIG. 17, floating mandrel 31 with its preferred PTFE coating on metal or unitary member of PTFE has a flexible connection 526 to the fixed mandrel in the extrusion die, which has been shown to overcome the problems of lost vacuum and distortion of the formed hollow profile. By assisting in keeping the hollow profile 575 from collapsing and by maintaining cross-sectional dimension "c" from the beginning to the end of the vacuum embossing step, the floating mandrel 31 assists in maintaining the quality of the extruded profile 575 in both its internal dimensions and its external textural surface. The floating mandrel 31 not only maintains the internal dimension of the profile 575, but also helps maintain the exterior wall of the profile 575 in close contact with the resilient mold belt 516 to insure that an embossed texture is made. Artificially supporting the interior of the extruded profile 575 also helps to maintain a vacuum seal between the resilient belts 515, 516 and the perforated belts 513, 514. Although the floating mandrel 31 is shown extending across the length of the vacuum boxes 508, 510, it preferably extends to at least the beginning of the vacuum boxes 508, 510 or to about line "d". This position will allow the vacuum boxes 508, 510 to maintain sufficient vacuum to keep the thin wall profile 575 and the resilient molding belt 516 in close proximity as they approach the vacuum box 510, even though a floating mandrel surface may or may not be provided beyond the edge of the vacuum box 510.

The surface texture elements or features 135, 235, 335 are irregular in recessed depth, raised height and area pattern having a dimension that varies in the cross-machine direction laterally of the continuous length, to appear as randomly shaped surface texture elements or features occurring in respective natural materials compared to a process of extrusion that is limited to producing straight length dimensions and constant cross sectional dimensions such as a straight groove of constant depth or a raised straight rib of constant height. The textured surfaces have a gloss level of less than about 50 on a 60° glossmeter, and the texture pattern has at least one texture pattern element with a dimension that varies in a cross-machine direction relative to the machine direction of the extrudate formed by extrusion. Following embossing, the embossed sides and thin wall profile of the embossed extrudate are subject to a calibration die 40 including but not limited to, a vacuum sizer or shaping die (collectively 40), or a combination thereof. Following sizing or other calibration, the embossed extrudate is then cooled in a cooling tank 50, and emerges as a finished product 60, 60', 160, 160', 260, 260' and 360, respectively. The vacuum embosser 30 provides the hollow profile with a low gloss, textured surface 135, 235 and 335, respectively, which comprises a pattern of surface texture features, wherein the surface texture elements or features are irregular in recessed depth, raised height and area pattern, to appear as randomly shaped surface texture elements or features occurring in respective natural materials, for example, a wood grain pattern, FIGS. 3A, 3B, 11, 11A and 14.

Figure 6:
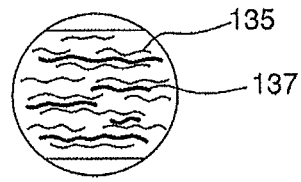
FIG. 6 is an enlarged view of the embossed polymeric material as it leaves the vacuum embosser of the apparatus of FIG. 4.

FIG. 4 discloses a second embodiment of an apparatus 200 for extruding and vacuum embossing a low gloss surface texture 135, FIG. 6, into one or more exterior surfaces of a hollow product 160, FIG. 14, that would be susceptible to collapse or bending by the heat and forces required for vacuum embossing. Thermoplastic material additives and colorants are disposed in the hopper 10, followed by extruding through the extruder 20. Following extrusion at the extruder 20, an extruded sheet extrudate is formed with a thin wall profile having a first interior major surface on an interior of the thin wall profile, and a second exterior major surface on an exterior of the thin wall profile. The extruded sheet extrudate has a unitary continuous lengthwise hinge folding 169 pivotally joining a first lateral side and a second lateral side of the extruded sheet. The hinge 169 is formed preferably by extrusion in the extruder 20 or, alternatively, by embossing in the vacuum embosser 30. The extrudate comprises the hollow product 160, FIG. 14, in an open and flat configuration prior to being folded along the hinge 169 to form a hollow closed configuration. The flat configuration is supported by the upper mold belt 516 against collapse thereof while the lower belt mold 515 embosses the exterior major surface of the extrudate with the pattern of embossed texture 135. A plurality of single ribs 162, FIGS. 4, 5, 8, 14 and 14a, extend continuously lengthwise and project outward and disposed on the first lateral side formed preferably by extrusion in the extruder 20 or alternatively formed by embossing in the top mold belt 516 of the vacuum embosser 30 and formed unitary with the first major surface, and a plurality of double ribs 164 extend continuously lengthwise and project outward and disposed on the second lateral side formed preferably by extrusion in the extruder 20 or by embossing in the top mold belt 516 of the vacuum embosser 30 and formed unitary with the same first major surface. The impression pattern in the mold belt 516 in FIG. 4 differs from the impression pattern of surface texture in the mold belt 516 in FIGS. 1, 9, 12 and 17, such that the mold belt 516 in FIG. 2 is shaped to conform to the shape of the ribs 162 and 164, instead of being shaped with an embossed texture 135, 235 or 335. FIGS. 14 and 14A disclose various alternative constructions of the single ribs 162 and of the double ribs 164. Continuous lengthwise frictional interengagement 161 of an exemplary extruded or embossed, straight shaped rib 162 with and between a set of two extruded or embossed straight shaped ribs 164 is disclosed. Continuous lengthwise latched interengagement 167 occurs between an exemplary rib 162 having lengthwise unitary V-shaped latches extruded on opposite sides, and complementary lengthwise V-shaped latches extruded on respective exemplary ribs 164. Alternatively each set of the double ribs 165 is modified by having a single rib 164 with a V-shaped latch to interengage with the V-shaped latch of a corresponding rib 162. A continuous lengthwise adhesive bond or a melt bond interengagement 163 of an exemplary extruded or embossed shaped rib 162 with and between a set of two extruded or embossed straight shaped ribs 164 is disclosed. An embodiment of an adhesive bond is formed by adding a hot melt adhesive. An embodiment of a melt bond results from heating the ribs 162 and 164 at their interface by an ultrasonic welding apparatus. As long as means for retaining the extruded embossed profile of the sheet into a folded closed hollow profile product 160 once folded and joined, the exemplary single ribs 162 interengaging corresponding sets of two exemplary ribs 164 take on any number of forms, including latched interengagement, an adhesive bond or a melt bond. Alternatively, a single rib 164 is substituted for each set of the double ribs 64 to interengage a corresponding rib 162. The set of interengaging ribs 162 and 164 closest to the hinge 169 is the first to be interengaged and interlocked, or heated or melted and thereby interlocked, followed, in turn, by each set that is progressively farther from the hinge 169 than a previously interengaged set, while in the process of pivoting lateral sides toward each other about the folding hinge 169 to fold the extruded embossed profile of the sheet from an open configuration to a closed configuration.

Figure 9:
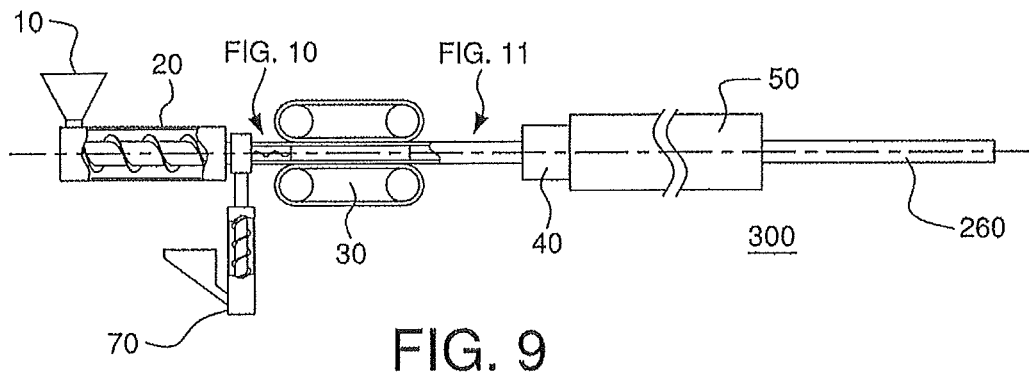
FIG. 9 is a partial diagrammatic side plan view of a third apparatus for extruding and continuously vacuum forming the polymeric material of this invention.
Figure 10:
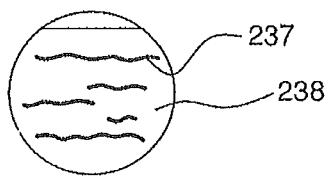
FIG. 10 is an enlarged view of the extruded material having a high gloss surface with a grain color following the extrusion step of the apparatus of FIG. 9.
Figure 11:
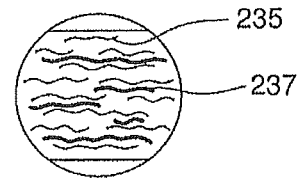
FIG. 11 is an enlarged view of the embossed material having a low gloss, textured surface and grain color following the vacuum embossing step of the apparatus of FIG. 9.
Figure 11B:
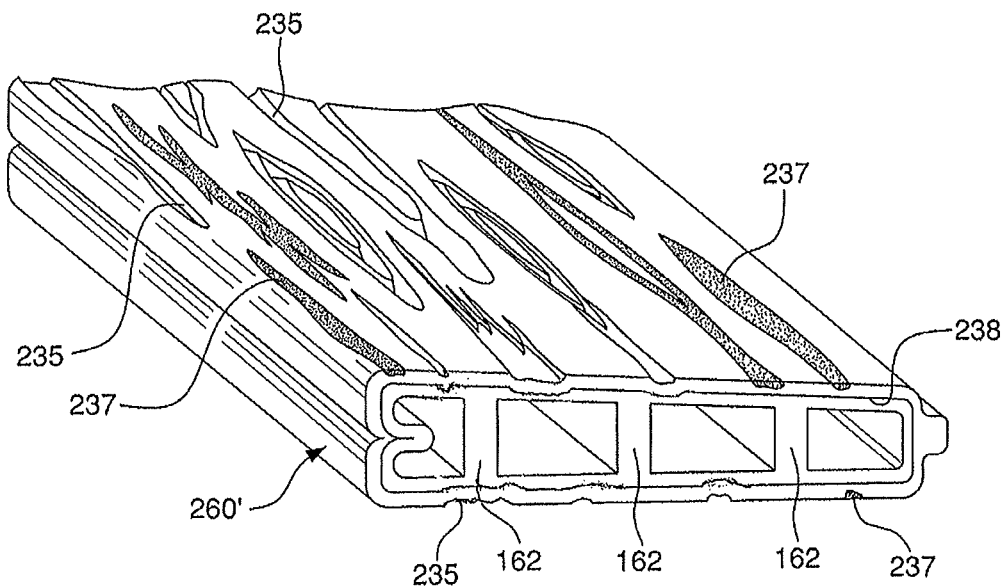
FIG. 11B is a schematic view of a hollow product similar to that of FIG. 11A and having a capstock layer.

In FIGS. 4 and 9 another extruder 70 of an alternative embodiment of the invention provides by co-extrusion, a second polymer composition to form an extruded capstock layer 138 in FIGS. 14A and 238 in FIG. 11B. A colorant, such as a streaker material is added in the hopper 10' of the extruder 70 for adding streaks of accent grain color 137 and 237, respectively, as disclosed further by U.S. Pat. No. 6,752,941. Alternatively, the grain color 137 and 237, respectively, comprises streaker colorants in the extrudate formed by the extruder 20 in the absence of a capstock layer 138 or 238, or alternatively, solely in the extrudate under the capstock layer 138 or 238, or alternatively, solely in the capstock layer 138 or 238, or further alternatively, in both the extrudate under the capstock layer 138 or 238 and in the capstock layer 138 or 238. The streaker colorants in the capstock layer 138 or 238 when present comprise the entirety of the grain color 137 or 237 or, alternatively, supplement the portion of the grain color 137 or 237 under the capstock layer 138 or 238 to add grain depth and color shades to the grain color 137 or 237. Due to co-extrusion and following such co-extrusion, the capstock layer 138 or 238 is bonded to the exterior second major surface of the extrudate formed by the extruder 20 and opposite the interior first major surface comprising the single rib 162 and the single or double ribs 164. The external second major surface on the capstock layer 138 or 238, or the extruded profile in the absence of a capstock layer, is then subject to an in-line, continuous embossing step at vacuum embosser 30, the bottom belt 515 of which provides an embossed surface texture, preferably, on the capstock layer 138 or 238 or, alternatively on the second major surface of the extruded profile of the sheet, as disclosed by FIGS. 3A, 11A and 14 in the absence of a capstock layer 138 or 238.

The capstock 138 or 238 provides a weather durable layer covering and protecting the core or base material of the vacuum molded product. An advantage results from vacuum molding the surface topography recesses 135 in the weather durable capstock 138 or 238 compared to etching, stamping or abrading to remove capstock material. The vacuum molded capstock 138 or 238 retains its desired thickness under each surface topography recess 135 formed by vacuum molding to maximize the thickness of the weather durable protection. The less viscous core or base material flows to become thinner. Thereby, the vacuum formed capstock 138 or 238 has a maximized thickness of weather durable protection, compared to etching, stamping or abrading to remove capstock material, which reduces the thickness and the useful life of the weather durable protection.

Figure 8:
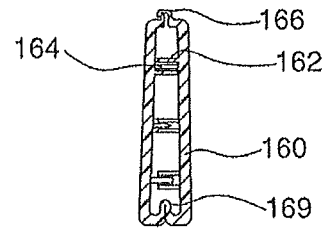
FIG. 8 is a cross-sectional view of a semi-finished product taken through line 8-8 of FIG. 4.

The extruded embossed profile of the folded sheet, FIGS. 14 and 14A, is conveyed through a set of folding dies 175, or similar equipment, which folds the extruded embossed profile of the sheet along the hinge 169 into a folded sheet 180, FIGS. 8, 14 and 14A, of a closed hollow product 160, 160' having a hollow profile and with the embossed second major surface on the extrudate or on the alternative embossed capstock layer 138 or 238 on the extrudate facing outward and comprising multiple exterior embossed sides of the closed hollow product 160, 160'. In FIG. 4, the folding dies 175, or joining device 177, or both, are used to join the single rib 162 with the single or double ribs 164 and form a continuous lengthwise joint 166, for example, a continuous tongue and groove joint 166, with the continuous tongue formed on one lengthwise edge of the extruded embossed profile of the sheet and the continuous groove formed on an opposite lengthwise edge of the extruded embossed profile of the sheet. The folding dies 175 fold the extruded embossed profile of the sheet along the hinge 169, while the joining device 177 applies hot melt adhesive, or heat to melt the lengthwise continuous surfaces of the ribs 162 and 164 such that when the hollow profile is completely closed an adhesive bond or melt bond is formed therebetween, followed by complete folding and closing of the hollow profile causing the tongue and groove of the interlocking joint 166 to interengage and latch the hollow profile in a closed configuration. The joining device 177 further applies hot melt adhesive or melts the tongue and groove joint 166 to form hot melt and adhesive bond or melt bond. Alternatively, the frictional interengagement or latched interengagement and retention of the ribs 162 and 164 occur while the hollow profile is folded and closed. This is followed by calibration, sizing, or shaping by operation of calibration dies 40, and finally, a cooling tank 50.

The finished product 160, 160' has a closed hollow profile, shown in FIGS. 8, 14 and 14A, in which the single rib 162, alternatively the single rib 162 joined to respective double ribs 164 by being mechanically joined or melt bonded, for example, to the double ribs 164, to form preferred reinforcing supporting rib structures bridging across the hollow interior from one lateral side of the interior surface to the other lateral side of the interior surface. The product 160, 160' preferably includes a tongue and groove, glued, mechanical or melt bond joint 166 used to clasp or retain the hollow profile into a closed structure, as well as a preferred hinge element 169 which allows the first and second shell portions or lateral sides of the structure to be pivoted or rotated about the hinge 169 and interengage or clasped to form the joint 166.

The preferred capstock layer, 138 or 238 or, alternatively, the exterior second major surface of the product 60, 160 or 260 in the absence of the capstock layer 138 or 238, includes streaks of a grain color 137 or 237 and embossed texture 135 or 235, as substantially shown in FIGS. 3A, 8, 11, 11A, 11B, 14 and 14A. Depending on the temperature of the polymeric material at the folding die 175 and joining device 177, the joint 166 comprises a mechanical connection or melt bond connection, and the connection between the single ribs 162 and double ribs 164 comprises a mechanical or melt bond, or some combination thereof. Similarly, the hinge 169 comprises, for example, a softened portion of the sheet, due to its elevated temperature at this stage of the process.

With reference to FIG. 9, there is shown a third apparatus 300 for extruding and vacuum forming polymeric material pursuant to this invention. This process employs an extruder 20 as in FIG. 1, and an alternative process comprises an extruder 70 which forms a coextruded capstock layer 238 in FIG. 11B in which the capstock layer 238 comprises the surface topography recesses 235 and the color enhancing wood grain such as the pattern of grain color 237. Following the co-extrusion operation, the extrudate has a high gloss surface 238 and the grain color 237 in FIG. 10. In this embodiment, the extrudate has a closed thin wall profile 260 in FIG. 11A without a capstock layer, or profile 260' with the capstock layer 238, FIG. 11B, and colorant enhancing wood grain 237 for providing the final effect of a wood appearance, including grain color 237 and low gloss texture 235. The grain color 237 comprises streaker colorants in the extrudate, FIG. 11A, in the absence of a capstock layer or alternatively in either the extrudate under the capstock layer 238 or the capstock layer 238, or further alternatively, in both the extrudate under the capstock layer and the capstock layer 238 to provide differences in grain color and differences in depth of grain color beneath the capstock layer 238.

The die of the extruder 20 is capable of converging the base thermoplastic for the substrate with a second thermoplastic material from the extruder 70 creating an outer layer or capstock layer 238 on the top of the first plastic material. This die of the extruder 20 has a low friction, floating mandrel or mandrels 31 so as to maintain a thin wall "hollow" product 260 or 260' with unitary internal ribs 162 similar to that of the product 60, FIG. 3A, produced by the process of FIG. 1. The floating mandrel or mandrels 31 are used to support the profile interior to resist collapse thereof during the vacuum embossing step. Second, third or more thermoplastic materials in the extrudate preferably have colorants, such as dyes, pigments and inks, etc., which create a wood grain color 237 appearance for example. The hollow profile is then subject to a vacuum embosser 30 with one or more rubbery belts to create an embossed surface texture 237, such as a wood texture, on one or more sides of the final product 260 or 260', followed by the application of vacuum sizing, calibrating or shaping steps by calibration die 40 and a cooling tank 50 to produce a final product 260 or 260'.

Figure 13:
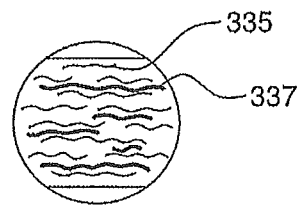
FIG. 13 is an enlarged view of the semi-finished shaped article having a low gloss, textured surface and grain decoration thereon.

As shown in FIG. 12, a fourth apparatus 400 for extruding and continuously vacuum forming a polymeric material is provided. In this apparatus 400, alternative "decorating" step(s), such as printing, to enhance wood-like appearances, create a wood grain on thin wall profiles by operation of printing techniques, preferably, gravure printing, roll printing, jet printing, water transfer printing, or hot foil transfer printing. As in the earlier apparatus, thermoplastic material, additives and colorants are disposed in pellet form into the hopper 10. The hopper 10 and extruder 20 is provided. An alternative embodiment comprises the extruder 70 and hopper 10' for a capstock layer 238. When a hollow profile is desired, low friction, floating mandrels 31 are used as in earlier embodiments. In an alternative embodiment a hot paint applicator, sprayer or printer 310 or 410, FIG. 15 or 12, performs in-line decorating by applying a painted wood grain to supplement or increase the wood grain of the streaker grain color of the colorants in the extrudate without a capstock layer and/or in an alternative embodiment of a capstock layer as well as the earlier stated printing techniques. As shown in FIG. 13, the decorating step combined with the embosser 30 provide supplemented grain color 337 along with low gloss texture 335 on the product 360. A printer 312 performs the decorating step wherein supplemented wood grain is applied during vacuum embossing, or after vacuum embossing by printer 311, or after the cooling tank 50, by printer 313. The paint or inks from one or more paint applicators 310, 410 or printers, alternatively 310, or 410, 311, 312 and/or 313 are applied after each previously applied ink layer cools to solidification, so that they provide overlapping and contrasting color, or are applied prior to cooling and solidification of one or more previously applied inks, so that the inks or colorants blend. Alternatively, the extruded embossed product comprises a random or irregular pattern of striations of recessed soft wood grain, and striations of harder wood grain that appear to be raised relative to the soft wood grain striations, as in FIG. 3B. Painted fence boards are simulated further by having such striations that appear with a coating of fresh paint applied by the painter 310, 410, as described with reference to FIGS. 12 and 17. Accordingly, the extruded embossed product of FIG. 3B comprises a painted board having a random or irregular pattern of striations of recessed soft wood grain, and striations of harder wood grain that appear to be raised relative to the soft wood grain striations, when painted by the painter 310, 410. Further, the painting operation covers surface defects, for example, surface color defects and surface abrasions.

As shown in FIG. 14, a fence board product 160 is provided having a substantially hollow profile, with a hinge 169, one or more sets of continuous lengthwise double ribs 164 combined with corresponding continuous lengthwise single ribs 162. The fence board product 160, alternatively comprises a single rib 162 with a frictional interengagement and retention 161 with a set of two ribs 164, or further alternatively, a set of two ribs 164 having complementary hook shaped latching surfaces 167, 168 interengaged and latched to complementary latching surfaces on opposite sides of a corresponding rib 162 therebetween. Alternatively, a series of full length double ribs 164 and single ribs 162 are provided for structural support through the hollow thickness of the fence board 160. A tongue and groove joint 166 is provided by extrusion at the respective edges of the extrudate, which, preferably, includes a mechanical locking or clasping arrangement, although this could easily be a melt-bond if the temperature of the profile is high enough upon joining, or heat is applied to the joint 166 during the joining step of the joining device 177, such as by a heated sizer of the calibration dies 40. As shown by the fence board product 160, a texture 135 and streaks of a grain color 137 are provided. The streaks of a grain color 137 represent a different color, contrast color, in the surface of the fence board product 160, while the texture 135 represents low gloss peaks and valleys of surface texture, a direct result of the vacuum embosser 30.

In FIG. 15, an extrusion, paint application and vacuum forming chamber is provided in a fifth apparatus 500 for vacuum forming polymeric material according to this invention. A thermoplastic material with additives and colorants is extruded from extruder 20 without a capstock layer, or alternatively with a capstock layer 138 in FIG. 14A formed by extrusion of second thermoplastic materials with colorants and additives in the extruder 70 as an alternative embodiment of the invention. The extruder 70 forms the capstock layer 138 on one major surface on one side (capstock layer) on the extruded strip (substrate) extrudate formed by the extruder 20 and the capstock extruder 70. The extrudate is about 2-20 feet in continuous length. An alternative embodiment of a decorator or paint applicator or printer 410 is provided to increase or supplement the appearance of wood grain color 137 by the application of additional colorants, such as by the printer 410. The extrudate with its printed streaks of a grain color or grain indicia 137 passes on to an embosser 425 in which vacuum or pressure forming equipment with one or more forming chambers (two illustrated) with mold impression(s) of a low gloss, wood-like texture 135 being impressed into the extrudate on the exterior major surface of the product 160 in FIG. 14 or the product 160' in FIG. 14A. The extrudate comprises the hollow product 160, FIG. 14 or the product 160' in FIG. 14A, in an open and flat configuration prior to being folded along the hinge 169 to form a hollow configuration. The flat configuration is supported against collapse thereof while the embosser 425 embosses the exterior major surface of the extrudate with the pattern of embossed texture 135. The semi-finished component, about 2-20 feet in continuous length, comprising the extrudate with the texture 137, is then passed on or conveyed on rails 414 and 416 on to a forming station 420 having, for example, the folding die 175 in FIG. 4 and the joining device 177 in FIG. 4, in which an embodiment of the embossed extrudate product is further formed and joined by gluing, melt bonding, welding, or via mechanical means, to form a low gloss, textured and hollow thin wall product 160 in FIG. 14 or, alternatively 160' in FIG. 14A. Ideally, both lateral sides of the embossed extrudate are unitary with each other along the hinge 169 and are folded and closed by joint 166, for example, such that the texture 135 and streaks of a grain color or grain indicia 137 are impressed into the product, e.g., four sides, for example.

EXAMPLE A

A fence board trial was conducted using new embossing belts on a vacuum forming machine with belt cooling fans. The following compositions were employed:

substrate: PVC with additives such as stabilizers, lubricants, impact modifiers, calcium carbonate and titanium dioxide for UV protection.

capstock layer: ASA with additives such as stabilizers, lubricants, impact modifiers, calcium carbonate and up to 10 parts of titanium dioxide for UV protection.

This product was made in a co-extrusion process in which substrate material PVC was extruded through a die by a first extruder, and capstock layer ASA material was extruded into the same die from another direction by a second extruder using the following settings:

Extruder Conditions for Example A

| Extruder Barrel Zones (BZ1-BZ4) | Main-Extrusion Core or Base Material Temperature | Co-extrusion (ASA) Temperature |
|---|---|---|
| BZ1 (Throat) | 370 | 330° F. |
| BZ2 | 360 | 330° F. |
| BZ3 | 320 | 340° F. |
| BZ4 | 310 | 340° F. |
| Screw Oil Heater Temperature | 310 | 290° F. |
| Die Temps | 350 | 350° F. |
| Screw Motor RPM | 700 | 800 |
| Hopper Feed Motor RPM | 150 | 80 |
| Belt Vacuum Inches Hg | | −14" |
| Dry Sizer (D.S.) Vacuum | | −5" |
| Ballast Tank Vacuum | | −5" |

Both the substrate and capstock layer materials merged in the extrusion die and exited the die orifice (exit) as a single hollow shape thin wall product made of two materials with each of them having different compositions.

The following color settings, sequences and measurements were made:

Color Settings for Example A

| | | |
|---|---|---|
| White | Base Feed Pounds/Hour (lb/hr) | 85 |
| | Color Feed (lb/hr) | n/a |
| Brown Streaker | Base Feed (lb/hr) | 85 |
| | Color Feed (lb/hr) | 650 |
| Clay | Base Feed (lb/hr) | 85 |
| | Color Feed (lb/hr) | 400 |
| Timber Streaker | Base Feed (lb/hr) | 85 |
| | Color Feed (lb/hr) | 650 |

The trial sequence was:
a. started with white pellets;
b. added Brown Streaker pellets 54120-A4 from Americhem (still using PVC base);
c. changed to ASA/Clay pellets; and
d. added Timber Streaker pellets 9062-A3 from Americhem (Centrex based color concentrate).

The melt temperature for PVC was 390° F.; for ASA it was 405° F. The profile strung up very easily once again with little or no difficulty attaining vacuum.

Auxiliary fans were used on both top and bottom belts for cooling. The belt temperature was approximately 205-210° F. A belt temperature below 200° F. will dramatically prolong the belt life. All dimensions were achieved with puller and belt speed adjustments. Currently, there is only one color feeder per extruder. Streaked color will typically require two feeders.

The hollow shape thin wall profile exited the die in a soft state with a high temperature and low rigidity. It then entered a system made of one, two, or more flexible rotating belts being strategically placed on the side(s) of the product where surface texture is required. In order for the texture transfer process to take place, the product had to be in a soft state. Vacuum was employed to draw the product toward the textured surface of the belt. For the vacuum force to take action, the vacuum chamber must be sealed. Due to its soft state, the extruded profile by itself can not support its own weight and the weight of sagging flexible belt. As such, the vacuum chamber is not sealed and texture transfer does not take place.

A floating mandrel(s) made of PTFE (or any other rigid material with a low friction surface) was employed to increase the rigidity of the system and close the seals between vacuum chamber, rotating flexible belts, and constantly moving forward soft extruded product. This floating mandrel(s) was attached by flexible means to the stationary metal mandrel(s) of the extrusion die. During the extrusion process, the floating mandrel located itself in such a position in respect to the vacuum chamber, that it sealed the extruded hollow shape thin wall product floating over the mandrel(s), which helped to seal in the entire belt system. This enabled the applied vacuum to pull the extruded product against the textured belt surface so that texture transfer took place.

After exiting the rotating flexible belts, the extruded product with a desired texture entered a vacuum calibration die with a cooling tank following the calibration process. In the final step of this process, the extruded product was cut to a desired length.

The final product had improved texture, definition and lower uniform gloss, when compared to a fence board of the same composition, but without texture.

These were deemed to be very positive results. All of the colors and material combinations produced very good looking samples. The Brown Streaker was not used in conjunction with any base colors, so it was just streaks on a light background color. Timber Streaker didn't provide much of a streaking effect because it melted so quickly in the ASA. Mandrels are attached to the die by wire and stainless steel fasteners, such as, eyebolt, 304 SS, 3/16"-24, 2" shank, 1" thread. McMaster Carr p/n 9489T81.

The resulting board had a textured pattern with a gloss reading of 27 on a 60° glossmeter, whereas a smooth PVC board made of the same materials had a gloss reading of 33 on a 60° glossmeter. The gloss was measured with Glossmeter Model 500-60°, manufactured by Erichsen Testing Equipment.

EXAMPLE B

A white fence board was produced by co-extrusion using a parallel screw extruder 125 mm. screw diameter to extrude PVC substrate, and a conical twin screw extruder 62 mm. screw diameter to extrude PVC capstock.

substrate: PVC pellets with additives such as stabilizers, lubricants, impact modifiers, calcium carbonate and titanium dioxide for UV protection capstock layer: PVC pellets with additives such as stabilizers, lubricants, impact modifiers, calcium carbonate and up to 10 parts of titanium dioxide for UV protection. PVC capstock is used for light color products. (In our situation, PVC capstock is used to produce white boards or light color boards).

The melted PVC substrate and melted PVC capstock merged in the extrusion die and exited the die orifice (exit) as a single hollow shape thin wall product made of two PVC based materials with each of them having different compositions. The melt temperature for PVC was 390 deg F. The hollow shape thin wall product after exiting the die has smooth (flat) external surface.

The product was made with extruders settings as in the below table:

| Extruder Barrel Zones (BZ1-BZ4) | Main-Extrusion Core or Base Material Temperature (° F.) | Co-extrusion (PVC) Temperature (° F.) |
|---|---|---|
| BZ1 (Throat) | 370 | 350 |
| BZ2 | 360 | 340 |
| BZ3 | 320 | 320 |
| BZ4 | 310 | 310 |
| Screw Oil Heater Temperature (° F.) | 310 | 300 |
| Die Temps (° F.) | 350 | 350 |
| Screw Motor RPM | 700 | 800 |
| Hopper Feed Motor RPM | 150 | 80 |

After exiting die the hot and flexible hollow shape thin wall product with smooth (flat) outside surface was pulled over floating low friction rigid mandrels attached by flexible means to pins in the die and suspended between silicone belts of the equipment having a textured surface.

The settings of the vacuum belt velocity were set to equal the exiting extrusion velocity of the thin wall hollow shaped product of 12 feet per minute, as in the below table:

| Belt Speed | 34.0 Hz rheostat setting |
|---|---|
| Belt Vacuum | −14 inches Hg |

After exiting the rotating flexible belts, the extruded product with a desired texture entered a vacuum calibration die with a cooling tank following the calibration process. The set up of the calibration die and ballast vacuum tank was as in the below table:

| Dry Sizer Vacuum | −5 inches Hg. |
|---|---|
| Ballast Tank Vacuum | −5 inches Hg. |

In the final step of this process, the extruded product was cut to a desired length.

EXAMPLE C

A fence board was produced by co-extrusion similarly as in Example B, except for Example C comprising ASA capstock material substituted for the PVC capstock material of Example B.

capstock layer: ASA pellets (with additives such as stabilizers, lubricants, impact modifiers and titanium dioxide for UV protection. ASA capstock is used for dark color products, for example, dark brown and clay color boards.

Color concentrate pellets were added to both materials at the same point as the material using separate single-screw color feeders with settings as in the below table:

| Clay | Base Feed PVC (substrate) - 400 lb/hr. | Color concentrate - 1 lb/hr. |
|---|---|---|
| | Capstock ASA feed - 100 lb/hr. | Color concentrate - 4 lb/hr. |
| Brown | Base Feed (substrate) - 400 lb/hr. | Color concentrate - 1 lb/hr. |
| | Capstock ASA feed - 100 lb/hr. | Color concentrate - 4 lb/hr. |

Capstock extrusion rate is 100 lb/h. Color concentrate was fed to the capstock material at a rate of 4 lb/hr. Substrate extrusion rate was 400 lb/hr. with the color concentrate added.

PVC substrate with colorant and ASA capstock with colorant merged in the extrusion die and exited the die orifice (exit) as a single hollow shape thin wall product made of two materials: PVC substrate and ASA capstock. The melt temperature for PVC was 390 deg F. and for the ASA capstock was 405 deg F. The hollow shape thin wall product after exiting the die has smooth (flat) outside surface. The product was produced with extruders settings as in the below table:

| Barrel Zones (B1-B4) | Main-Extrusion Core or Base Material Temperature (° F.) | Co-extrusion (ASA) Temperature (° F.) |
|---|---|---|
| BZ1 (Throat) | 370 | 330 |
| BZ2 | 360 | 330 |
| BZ3 | 320 | 340 |
| BZ4 | 310 | 340 |
| Screw Oil Heater | 310 | 290 |
| Die Temps | 350 | 350 |
| Motor RPM | 700 | 800 |
| Feed | 150 | 80 |

After exiting die the hot and flexible hollow shape thin wall product with smooth (flat) outside surface was pulled over floating low friction mandrels attached by flexible means to pins in the die and suspended between silicone belts of the equipment changed from flat (smooth) external surface for impression in the product to a textured surface.

EXAMPLE D

According to Example D, a fence board was produced similarly as Example C and with streaker pellets added to the capstock layer of Example D.

substrate: PVC with additives such as stabilizers, lubricants, impact modifiers, calcium carbonate and titanium dioxide for UV protection capstock layer: ASA pellets (with additives such as stabilizers, lubricants, impact modifiers and titanium dioxide for UV protection. ASA capstock is used for dark color products, for example, dark brown and clay color boards. Streaker pellets #58437-87 from Americhem Inc., Cuyahoga Falls, Ohio 44221, added at a rate of 2 lb/hr (corresponding to a feeder setting at 200).

Color concentrate pellets were added to both materials at the same point as the material using separate single-screw color feeders with settings as in the below table:

| Clay | Base Feed PVC (substrate) - 400 lb/hr. | Color concentrate - 1 lb/hr. |
|---|---|---|
| | Capstock ASA feed - 100 lb/hr. | Color concentrate - 4 lb/hr. Streaker - 2 lb/hr. |
| Brown | Base Feed (substrate) - 400 lb/hr. | Color concentrate - 1 lb/hr. |
| | Capstock ASA feed - 100 lb/hr. | Color concentrate - 4 lb/hr. Streaker - 2 lb/hr. |

From PVC substrate with colorant and ASA capstock with colorant and streaker merged in the extrusion die and exited the die orifice (exit) as a single hollow shape of thin walls made of two materials: PVC substrate with colorant, and ASA capstock with colorant and streaker. The melt temperature for PVC was 390 deg F. and for the ASA capstock was 405 deg F. The hollow shape thin wall product after exiting the die has smooth (flat) outside surface.

The product was produced with the same, extruder(s) settings, belt settings and vacuum calibration die settings as for Example C.

The patents and applications referred to are hereby incorporated by reference herein.

From the foregoing description, an invention provides exterior building materials that include hollow, closed, thin wall profiles comprising a polymeric composition including additives and colorants. The exterior facing surface of the profile includes a low gloss, textured pattern disposed continuously along the exterior facing surface portion for about 2-20 feet. The present invention provides texture, pattern and low gloss similar to real wood products. The combination of extrusion processing with continuous vacuum embossing processes is capable of enhancing product appearance by applying a low gloss pattern in any direction, including the cross-extrusion direction, to thin wall product surfaces so as to emulate wood texture. In particular, hollow profile extrusion in combination with continuous vacuum embossing processes can be used to produce useful building materials emulating a natural texture. Furthermore, the combination of thermoplastic materials with colorants and/or a combination of extrusion processes with in-line decorating processes will add grain as a final parameter of natural wood fence boards, decking and other exterior building products.

What is claimed is:

1. A building product comprising:
    a unitary extrudate having a first lateral side and a second lateral side;
    the unitary extrudate having unitary ribs on the lateral sides of the unitary extrudate;
    the lateral sides of the unitary extrudate having a continuous length pattern of embossed surface topography features simulating randomly shaped surface texture features occurring in natural materials;
    the first lateral side and the second lateral side of the unitary extrudate being pivotally joined by a unitary hinge at a first location; and
    the first lateral side and the second lateral side having respective lengthwise edges that interengage at a melt bonded lengthwise joint at a second location.

2. The building product of claim 1 wherein the unitary ribs comprise first ribs on the first lateral side and second ribs on the second lateral side, wherein the first ribs and the second ribs interlock.

3. The building product of claim 1 wherein the unitary ribs comprise first ribs on the first lateral side and second ribs on the second lateral side, wherein the first ribs and the second ribs interlock by latching together.

4. The building product of claim 1 wherein the unitary ribs comprise first ribs on the first lateral side and second ribs on the second lateral side, wherein the first ribs and the second ribs interlock by an adhesive bond.

5. The building product of claim 1 wherein the unitary ribs comprise first ribs on the first lateral side and second ribs on the second lateral side, wherein the first ribs and the second ribs interlock by a melt bond.

6. The building product of claim 1 wherein the continuous length pattern of surface topography features simulate wood grain.

7. The building product of claim 1 wherein the continuous length pattern of surface topography features simulate an unpainted low gloss, rough wood surface.

8. The building product of claim 1 wherein the continuous length pattern of surface topography features comprise a low gloss level of less than about 50 on a 60° glossmeter.

9. The building product of claim 1 wherein the unitary extrudate comprises streaker grain color.

10. The building product of claim 1 wherein the unitary extrudate comprises a capstock layer, and either with or without streaker material in the capstock layer, and wherein exterior surface portions of the capstock layer comprise a low gloss continuous length pattern of surface topography features having a gloss level of less than about 50 on a 60° glossmeter.

11. The building product of claim 1 wherein the continuous length pattern of surface topography features simulate an unpainted low gloss, rough wood surface, and wherein the unitary extrudate comprises streaker grain color.

12. The building product of claim 1 wherein the unitary extrudate comprises a plurality of variegation layers wherein each of the variegation layers includes a transparent or semi-transparent matrix and a colorant streaker pattern.

13. The building product of claim 1 wherein the unitary extrudate comprises a lamination of a capstock layer on a substrate.

14. The building product of claim 1 wherein the unitary extrudate comprises a coating of a capstock layer on a substrate.

* * * * *

UNITED STATES PATENT AND TRADEMARK OFFICE
CERTIFICATE OF CORRECTION

PATENT NO. : 8,955,281 B2  Page 1 of 1
APPLICATION NO. : 12/685800
DATED : February 17, 2015
INVENTOR(S) : Pietruczynik et al.

It is certified that error appears in the above-identified patent and that said Letters Patent is hereby corrected as shown below:

On the title page item [56],

On page 2, item (56) under References Cited, OTHER PUBLICATIONS, insert --US Application No. 10/983,389, Guiselein et al. 11/08/2004--

Signed and Sealed this
Seventeenth Day of November, 2015

Michelle K. Lee
*Director of the United States Patent and Trademark Office*